United States Patent
Oura

(10) Patent No.: US 6,738,761 B1
(45) Date of Patent: May 18, 2004

(54) INFORMATION PROCESSING SYSTEM CAPABLE OF INDICATING TENDENCY TO CHANGE

(75) Inventor: Toshio Oura, Tokyo (JP)

(73) Assignee: NEC Corporation, Tokyo (JP)

( * ) Notice: Subject to any disclaimer, the term of this patent is extended or adjusted under 35 U.S.C. 154(b) by 279 days.

(21) Appl. No.: 09/661,379

(22) Filed: Sep. 13, 2000

(30) Foreign Application Priority Data

Sep. 17, 1999 (JP) ............................................ 11-264457

(51) Int. Cl.[7] ............................ G06F 7/00; G06F 17/30
(52) U.S. Cl. ...................... 707/3; 707/104.1; 345/440; 345/968
(58) Field of Search .................. 707/3, 104.1; 345/440, 345/835, 839, 968; 715/503, 504

(56) References Cited

U.S. PATENT DOCUMENTS

| | | | | | |
|---|---|---|---|---|---|
| 5,226,118 | A | * | 7/1993 | Baker et al. ................. | 345/833 |
| 5,262,943 | A | * | 11/1993 | Thibado et al. ............. | 600/300 |
| 5,412,769 | A | * | 5/1995 | Maruoka et al. ............ | 345/440 |
| 5,563,983 | A | * | 10/1996 | Nozaki et al. ................ | 706/21 |
| 5,581,752 | A | * | 12/1996 | Inoue et al. ................. | 707/526 |
| 5,623,590 | A | * | 4/1997 | Becker et al. ............... | 345/772 |
| 5,636,350 | A | * | 6/1997 | Eick et al. ................... | 345/440 |
| 5,732,260 | A | * | 3/1998 | Nomiyama .................... | 707/5 |
| 5,778,352 | A | * | 7/1998 | Inoue et al. ................... | 707/1 |
| 5,794,178 | A | * | 8/1998 | Caid et al. ...................... | 704/9 |
| 6,006,223 | A | * | 12/1999 | Agrawal et al. ............... | 707/5 |
| 6,038,561 | A | * | 3/2000 | Snyder et al. ................. | 707/6 |
| 6,128,403 | A | * | 10/2000 | Ozaki ........................... | 382/145 |
| 6,151,582 | A | * | 11/2000 | Huang et al. .................. | 705/8 |
| 6,334,132 | B1 | * | 12/2001 | Weeks ........................ | 707/101 |

FOREIGN PATENT DOCUMENTS

| | | |
|---|---|---|
| JP | 05-165893 | 7/1993 |
| JP | 06-274387 | 9/1994 |
| JP | 06-301682 | 10/1994 |
| JP | 07-182356 | 7/1995 |
| JP | 07-319905 | 12/1995 |
| JP | 06-246774 | 4/1996 |
| JP | 08-221435 | 8/1996 |
| JP | 08-320881 | 12/1996 |
| JP | 09-218878 | 8/1997 |
| JP | 09-311862 | 12/1997 |
| JP | 10-049544 | 2/1998 |
| JP | 10-055367 | 2/1998 |
| JP | 10-301935 | 11/1998 |
| JP | 11-031185 | 2/1999 |
| JP | 11-212988 | 8/1999 |

OTHER PUBLICATIONS

Japanese Office Action dated Mar. 18, 2003 with English translation of pertinent portions.

(List continued on next page.)

Primary Examiner—Safet Metjahic
Assistant Examiner—Brian Goddard
(74) Attorney, Agent, or Firm—Whitham, Curtis & Christofferson, P.C.

(57) ABSTRACT

In an information processing system, an information storing unit stores a plurality of main information sets along with time information sets. A retrieval condition input unit inputs retrieval conditions for the main information sets. A retrieval execution unit performs a retrieval upon the main information sets along with the time information sets by using the retrieval conditions. A cell output information generating unit receives retrieved main information sets along with the time information sets and generates a number of the main information sets and a tendency of the number of the main information sets to change with respect to time for each of cells defined by the retrieval conditions. A cell output unit outputs each of the cell and displays each of the cells at a location on a matrix designated by the retrieval conditions.

55 Claims, 32 Drawing Sheets

OTHER PUBLICATIONS

Ariga, "Creation of a Technology Information Map in which JOIS Data has been Highly Activated and Analysis of Technology Trends and Technology Distribution, etc. in a Market Environment", Compilation of Presentations of the Information Science Technology Research Association, Vo. 29, 1993, pp. 247–255.

Arai, Y. Technical Trends and Distribution Survey Accomplished by Patent Information Analysis, IPC, 7th Edition.

Office Action in corresponding Japanese Application together with English language translation of same.

Arai, Y. "Patent Map Analysis and the Use of the Personal Computer", Compilation of Presentations of the information Science Technology Research Association, vol. 24, 1988, pp. 63–69.

* cited by examiner

Fig. 1 PRIOR ART

| | C01B3 3/12 | C03B 19/06 20/00 | C03B 20/00 | C03B 37/00 | D07B 1/16 | F23D 13/30 | G02B 5/14 | G02B 5/17 | G02B 5/30 | G05D 3/12 | H01P 3/00 |
|---|---|---|---|---|---|---|---|---|---|---|---|
| E1 | ⊘ | ⊘ | | ⊘ | | | ◯ | | | | |
| E2 | | | | ⊘ | | ⊘ | ◯ | | | ⊘ | |
| E3 | | | | ⊘ | | | ◯ | ⊘ | ⊘ | | |
| E4 | | | | | | | ◯ | | | | |
| E5 | | | | | | | ◯ | ⊘ | | | |
| ⋮ | ⋮ | ⋮ | ⋮ | ⋮ | ⋮ | ⋮ | ⋮ | ⋮ | ⋮ | ⋮ | ⋮ |
| FIELD & PROCESS / IPC | | | | | | | | | | | |

| DATE 1 | DATE 2 | DATE 3 | CATEGORY 1 | CATEGORY 2 | CATEGORY 3 | ... | TEXT | ... |
|---|---|---|---|---|---|---|---|---|
| | | | | | | | | |
| | | | | | | | | |
| ... | ... | ... | ... | ... | ... | ... | ... | ... |

| ELEMENT | | |
|---|---|---|
| MATERIAL | PROCESS | ← 61 |
| | | |

Fig. 6B

| ELEMENT | | | |
|---|---|---|---|
| MATERIAL | | PROCESS | ← 61 |
| RESIN | ALLOY | | ← 62 |

Fig. 6C

| ELEMENT | | | | |
|---|---|---|---|---|
| MATERIAL | | | PROCESS | ← 61 |
| RESIN | | ALLOY | OTHERS | ← 62 |
| A1 | A2 | | | ← 63 |

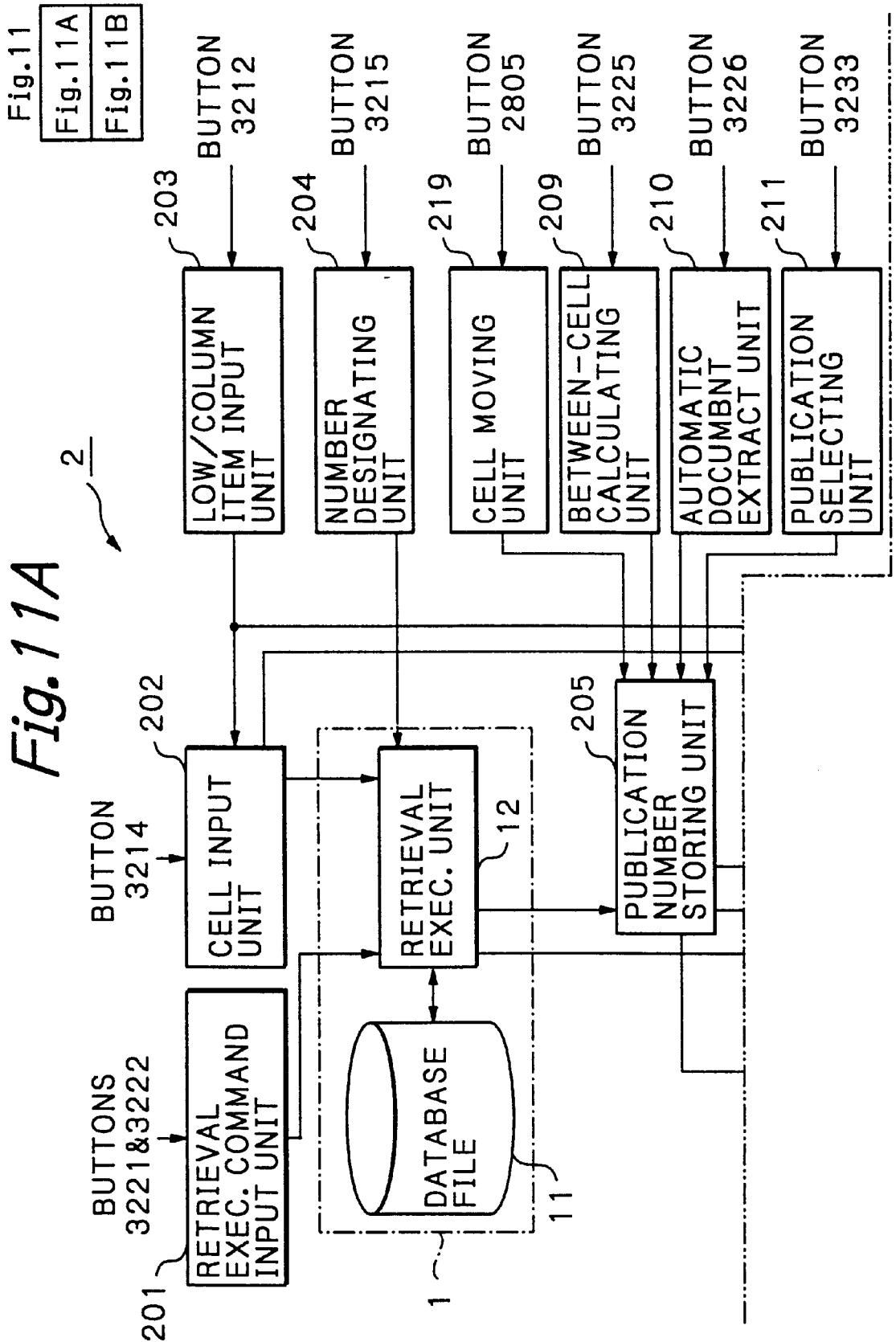

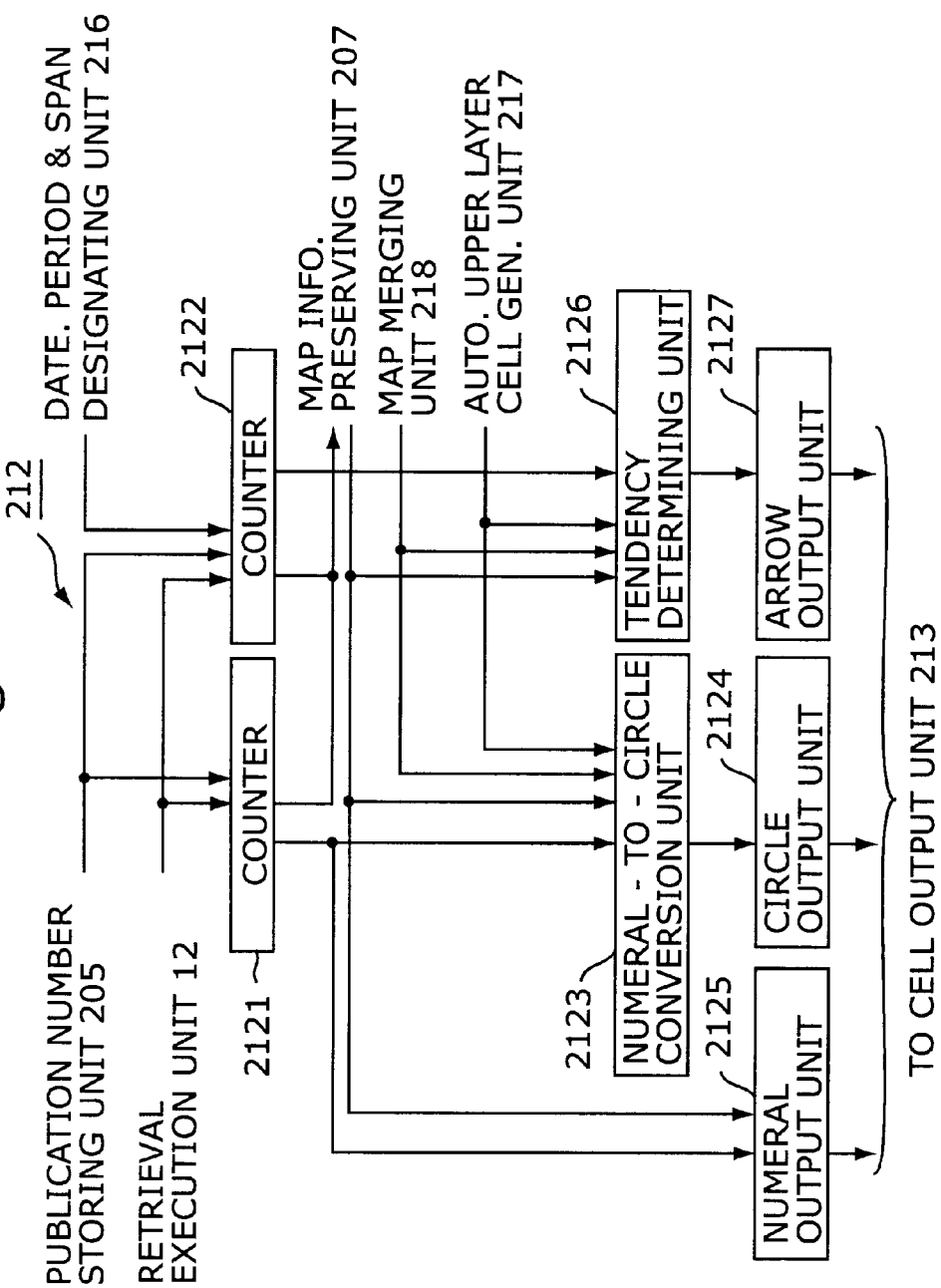

INFORMATION PROCESSING SYSTEM CAPABLE OF INDICATING TENDENCY TO CHANGE

BACKGROUND OF THE INVENTION

1. Field of the Invention

The present invention relates to an information processing system such as a patent mapping system.

2. Description of the Related Art

In an information processing system, a retrieval is performed upon a huge amount of information in a database to obtain the tendency of the information. Particularly, in a patent information processing system, a patent mapping apparatus is essential.

In a patent map obtained by a first prior art patent mapping apparatus (see JP-A-11-15833), a map having an abscissa indicating International Patent Classifications (IPCs) and an ordinate indicating manufacturing fields and processes is prepared. That is, the number of patent publications is calculated for each IPC and each of the manufacturing fields and processes, and then, one circle having a diameter showing the number of patent publications is depicted at each intersection between the IPCs and the manufacturing fields and processes, thus visually indicating the number of patent publications. This will be explained later in detail.

In the above-described first prior art patent mapping apparatus, however, it is impossible to time-sequentially indicate the patent publications.

In a second prior art patent mapping apparatus (see FIG. 7 of JP-A-8-221435), a diagram having an abscissa indicating years and an ordinate indicating the number of patent publications for a certain number of companies is generated. That is, the number of patent publications per year can be visually indicated. This also will be explained later in detail.

In the above-described second prior art patent mapping apparatus, however, it is impossible to easily indicate the tendency of the number of patent publications for each company to increase or decrease.

SUMMARY OF THE INVENTION

It is an object of the present invention to provide an information processing system such as a patent mapping system capable of indicating the tendency of the number of information sets to increase or decrease.

According to the present invention, in an information processing system, an information storing unit stores a plurality of main information sets along with time information sets. A retrieval condition input unit input retrieval conditions for the main information sets. A retrieval execution unit performs a retrieval upon the main information sets along with the time information sets by using the retrieval conditions. A cell output information generating unit receives retrieved main information sets along with the time information sets and generates a number of the main information sets and a tendency of the number of the main information sets which changes with respect to time for each cell defined by the retrieval conditions. A cell output unit outputs each of the cells and displays each of the cells at a location on a matrix designated by the retrieval conditions.

BRIEF DESCRIPTION OF THE DRAWINGS

The present invention will be more clearly understood from the description set forth below, as compared with the prior art, with reference to the accompanying drawings, wherein:

FIG. 1 is a patent map obtained by a first prior art patent mapping apparatus;

FIG. 4 is a diagram showing an example of the database file of FIG. 3;

FIGS. 6A, 6B and 6C are diagrams showing examples of the items in the column direction of FIG. 5;

FIG. 17 is a detailed block circuit diagram of the cell output information generating unit of FIG. 11;

DESCRIPTION OF THE PREFERRED EMBODIMENT

Before the description of the preferred embodiment is given, prior art patent mapping apparatuses will be explained with reference to FIGS. 1 and 2.

In FIG. 1, which illustrates a patent map obtained by a first prior art patent mapping apparatus (see JP-A-11-15833), the abscissa indicates International Patent Classifications (IPCs) and the ordinate indicates manufacturing fields and processes. That is, the number of patent publications is calculated for each IPC and each of the manufacturing fields and processes and, then, a circle having a diameter showing the number of patent publications is depicted at each intersection between the IPCs and the manufacturing fields and processes, thus visually indicating the number of patent publications.

In the first prior art patent mapping apparatus, however, although it is important to indicate the patent publications on a basis of time, it is impossible to time-sequentially indicate the patent publications.

Figure 2:
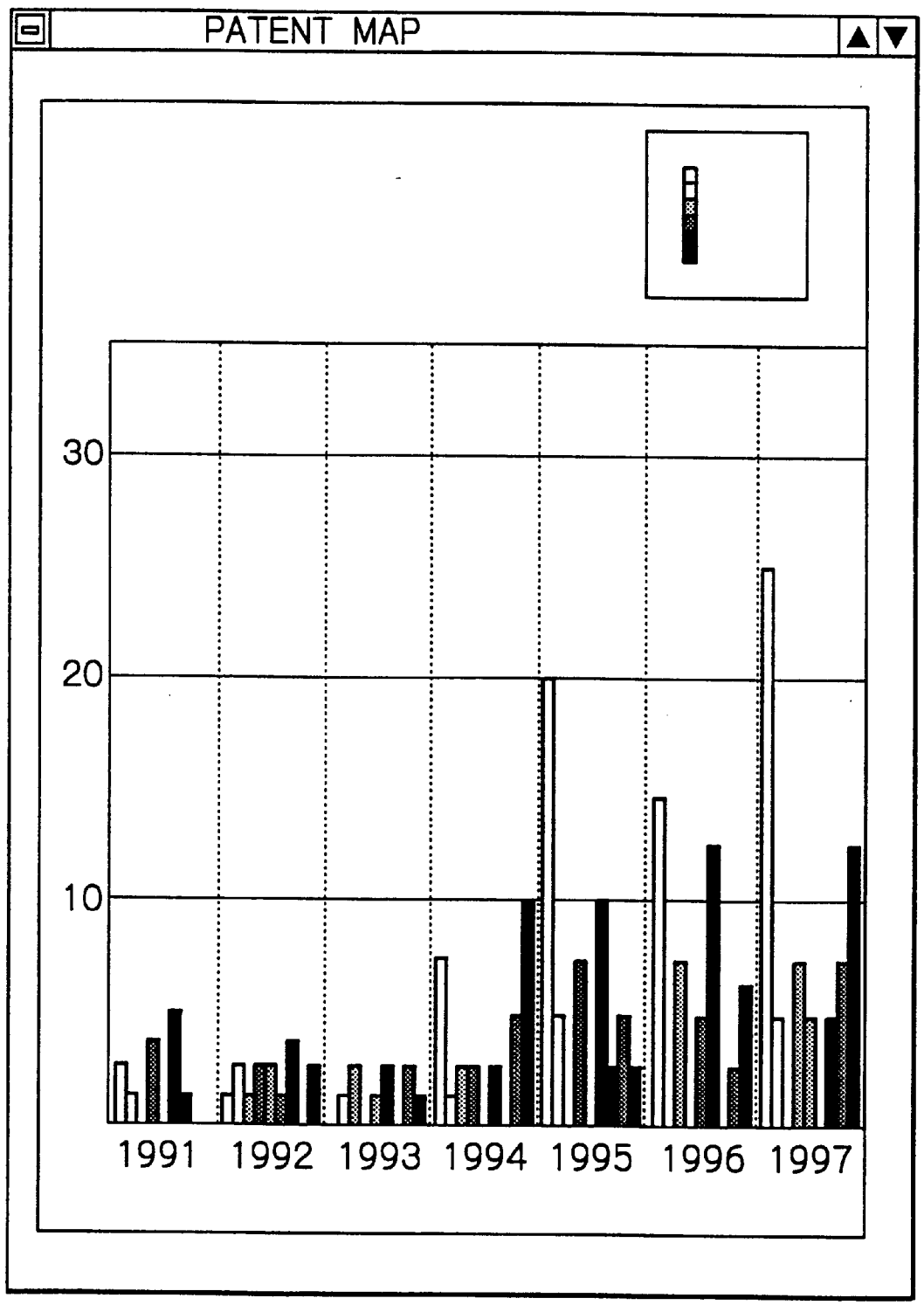
FIG. 2 is a patent histogram obtained by a second prior art patent mapping apparatus.

In FIG. 2, which illustrates a patent histogram obtained by a second prior art patent mapping apparatus (see FIG. 7 of JP-A-8-221435), the abscissa indicates years and the ordinate indicates the number of patent publications for a certain number of companies. That is, the number of patent publications per year can be visually indicated.

In the second prior art patent mapping apparatus, however, it is impossible to easily indicate the tendency of patent publications for each company to increase or decrease.

Figure 3:
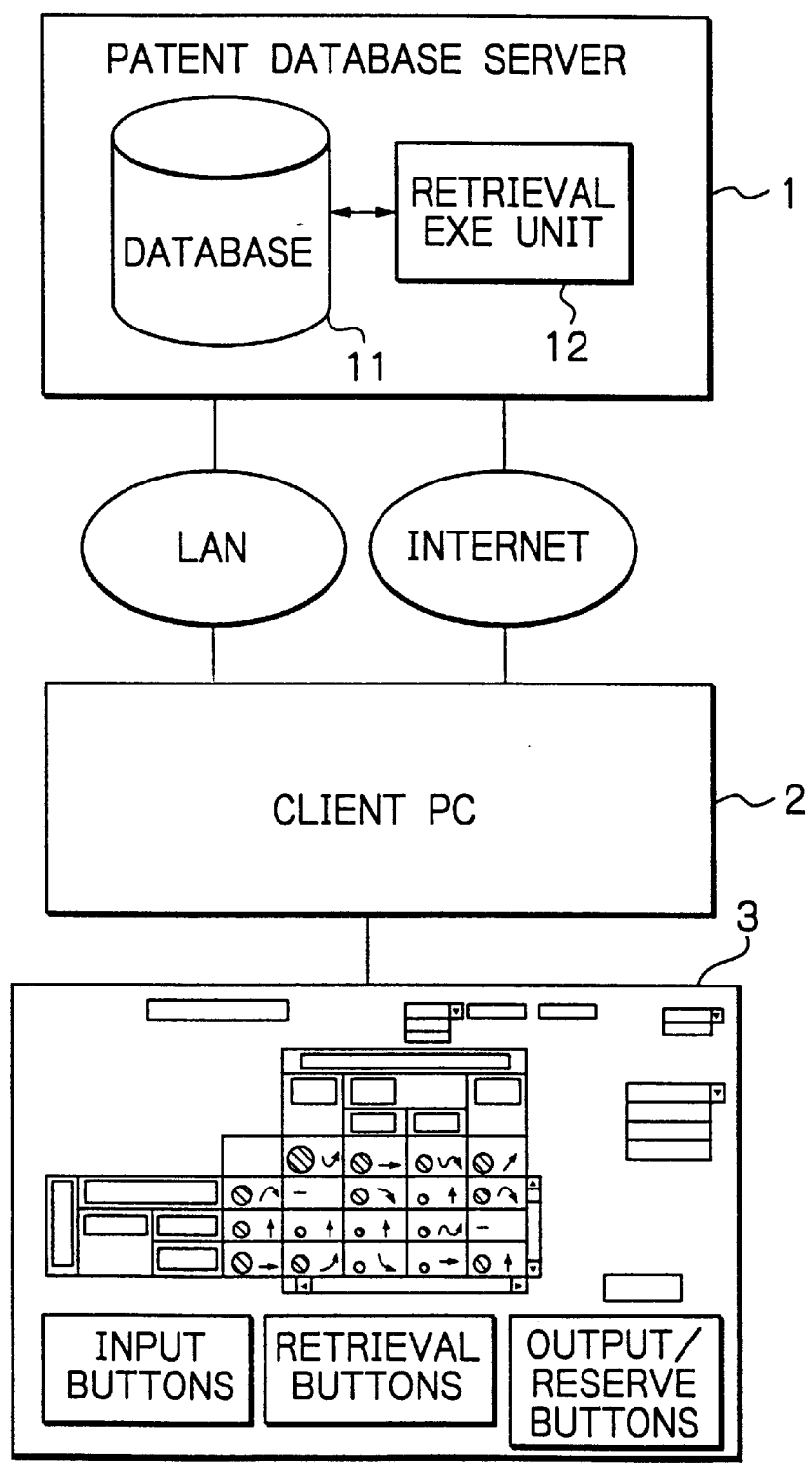
FIG. 3 is a block circuit diagram illustrating an embodiment of the patent mapping system according to the present invention.

In FIG. 3, which is a block circuit diagram illustrating an embodiment of the patent mapping system according to the present invention, reference numeral 1 designates a patent database server connected via a local area network (LAN) and the Internet to a client personal computer 2 which has a display unit 3.

The server 1 is constructed by a database file 11 and a retrieval execution unit 12.

In FIG. 4, which shows an examples of the database file 11 of FIG. 3, the database file 11 has a relational structure where one patent publication is stored in one record. For example, one patent publication is constructed by dates such as filing date, a publication date and a registered date, attributes (categories) such as an IPC, applicants and inventors, text information including a specification, claims, drawings and an abstract, and the like. Note that the database file 11 can be another kind of structure.

Logic operations such as an AND logic operation, an OR logic operation and a NOT logic operation are performed upon the attributes of the database file 11, thus carrying out various kinds of analysis of the patent publications.

Also, specific patent publications are extracted from the database file 11 by using one or more specific key words used in the specifications and abstracts of the patent publications in the database file 11.

Figure 5:
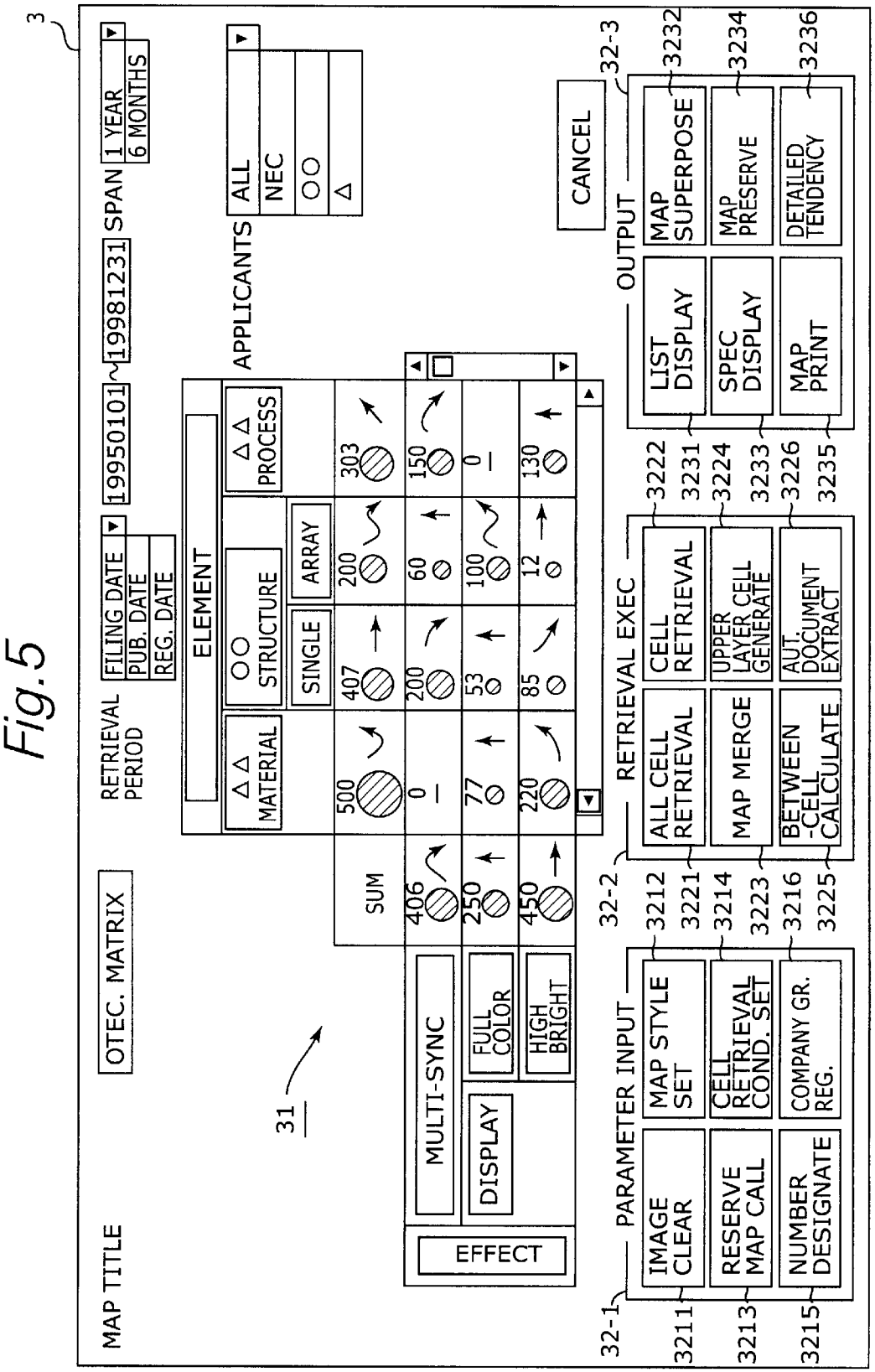
FIG. 5 is a diagram showing an example of the display unit of FIG. 3.

In FIG. 5, which is an example of the display unit 3 of FIG. 3, an image of the display unit 3 is largely divided into a map image 31 on the upper side and three button images 32-1, 32-2 and 32-3 on the lower side.

In the map image 31, item "effect" is arranged in the row direction and item "element" is arranged in the column direction. Also, the item "effect" has item "multi-sync" and item "display" as a first layer, and item "display" has item "full-color" and item "high brightness" as a second layer. On the other hand, item "element" has item "material", item "structure" and item "process" as a first layer, and item "structure" has item "single" and item "array" as a second layer. Note that these items are used for liquid crystal display (LCD) apparatuses.

Depicted at each intersection between the items in the row direction and the column direction is a cell formed by a circle having a diameter corresponding to the number of patent publications affixed thereto and an arrow showing the tendency of the number of patent publications to increase or decrease.

Also, depicted at each of the items in the row direction is a circle having a diameter corresponding to the total number of patent publications affixed thereto and an arrow showing the tendency of the number of patent publications to increase or decrease.

Further, depicted at each of the items in the column direction is a circle having a diameter corresponding to the total number of patent publications affixed thereto and an arrow showing the tendency of the number of patent publications to increase or decrease.

Note that the total numbers of patent publications in the row direction and in the column direction are not the sums of the corresponding patent publications, because one patent publication is located at one or more intersections between the items in the row direction and the items in the column direction.

The button image 32-1 is a parameter input image which is formed by an image clear button 3211, a map style set button 3212, a reserve map call button 3213, a cell retrieval condition set button 3214, a number designate button 3215, and a company group register button 3216.

The button image 32-2 is a retrieval execution image which is formed by an all-cell retrieval button 3221, a selective cell retrieval button 3222, a map merge button 3223, an automatic upper layer cell generate button 3224, a between-cell calculate button 3225, and an automatic document extract button 3226.

The button image 32-3 is an output image which is formed by a list display button 3231, a map superpose button 3232, a publication display button 3233, a map preserve button 3234, a map print button 3235, and a detailed tendency button 3236.

The map image 31 and the button images 32-1, 32-2 and 32-3 are displayed as one image and, therefore, it is unnecessary to switch the map image 31 to one of the button images 32-1, 32-3 and 32-3 or vice versa.

As explained above, each patent publication has dates such as a filing date, a publication date and a registered date. Therefore, patent publications to be retrieved can be limited to those having dates, such as filing dates, within a predetermined period. In this case, the predetermined period is a multiple of one year or sixth months which is called a span. In this example of FIG. 5 the filing dates of retrieved patent publications are from Jan. 1, 1995 to Dec. 31, 1998, which is divided into three spans where one span is one year.

The items in the row and column directions can be single-layered or multi-layered as illustrated in FIGS. 6A, 6B and 6C. Note that FIG. 6A illustrates a single-layered column formed by a layer 61, FIG. 6B illustrates a double-layered column formed by layers 61 and 62, and FIG. 6C illustrates a triple-layered column formed by layers 61, 62 and 63. The number of layers and the number of items of each layer can be set by using the map style set button 3212. For example, for the items in the column direction as illustrated in FIG. 6A, data of these items is represented by

ELEMENT/MATERIAL/PROCESS

Also, for the items in the column direction as illustrated in FIG. 6B, data of these items is represented by

ELEMENT/MATERIAL·RESIN/MATERIAL·ALLOY/
   PROCESS/

Further, for the items in the column direction as illustrated in FIG. 6C, data of these items are represented by ELEMENT/MATERIAL·RESIN·A1/
MATERIAL·RESIN·A2/MATERIAL·ALLOY/
MATERIAL·OTHERS/PROCESS/

Modifications of the cell of FIG. 5 are illustrated in FIGS. 7A, 7B, 7C, 7D, 8, 9A, 9B and 10.

Figure 7A:
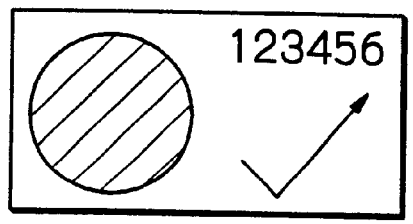
FIGS. 7A, 7B, 7C, 7D, 8, 9A, 9B and 10 are diagrams showing examples of the cells of FIG. 5.

In FIG. 7A, the number of patent publications are affixed to the arrow showing the tendency to increase or decrease. Note that the arrow along with the number of patent publications can be arranged below the circle.

Figure 7B:
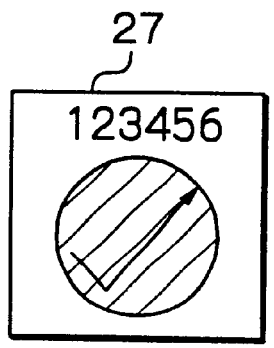

In FIG. 7B, the circle is superposed onto the arrow, to decrease the size of the cell. This increases the number of cells displayed on one image.

Figure 7C:
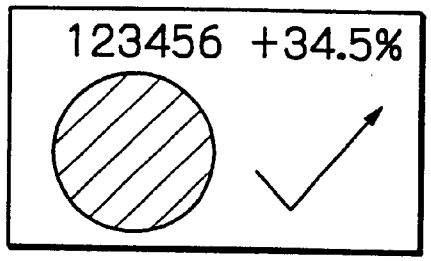

In FIG. 7C, the ratio of increased or decrease patent publications is affixed to the arrow, thus accurately indicating the ratio of increased or decreased patent publications.

Figure 7D:
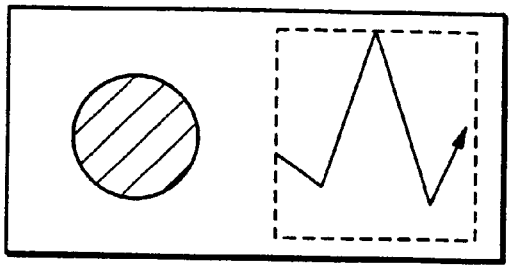

In FIG. 7D, a line graph swung fully within a dotted region is provided instead of the arrow and the number of patent publications of FIG. 7A, thus accurately indicating the tendency of patent publications to increase or decrease.

Figure 8:
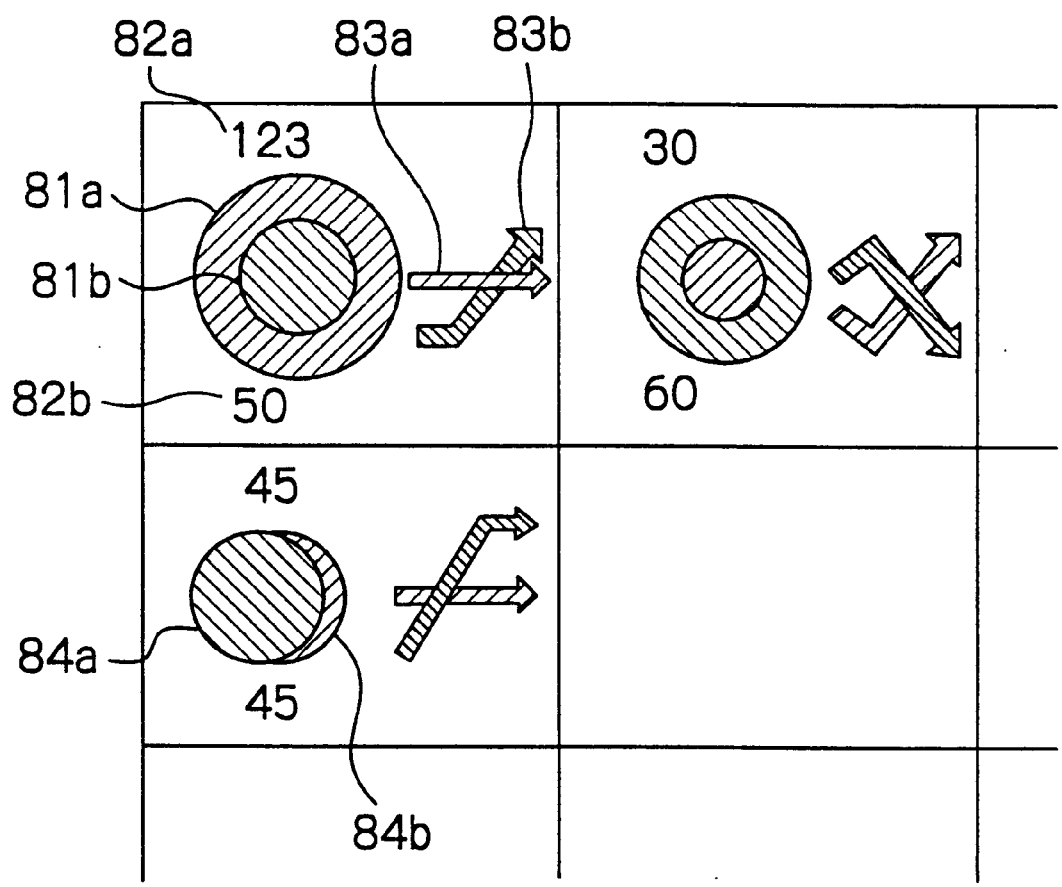

In FIG. 8, two kinds of information on patent publications are depicted in one cell. For example, a circle 81a showing the number 82a of patent publications on a basis of publication dates and an arrow 83a showing the tendency to increase or decrease are depicted in one cell. Simultaneously, a circle 81b showing the number 82b of patent publications on a basis of registered dates and an arrow 83b showing the tendency to increase or decrease are depicted in the same cell. If the numbers of two kinds of patent publications are the same, circles 84a and 84b are shifted a little from each other.

Note that the above-mentioned two kinds of information regarding patent publications can be directed to two different applicants (companies).

In FIG. 8, although the two kinds of information are identified by two kinds of hatchings, the two kinds of information can be identified by two kinds of colors. Also, three or more kinds of information regarding patent publications can be depicted in one cell.

Figure 9A:
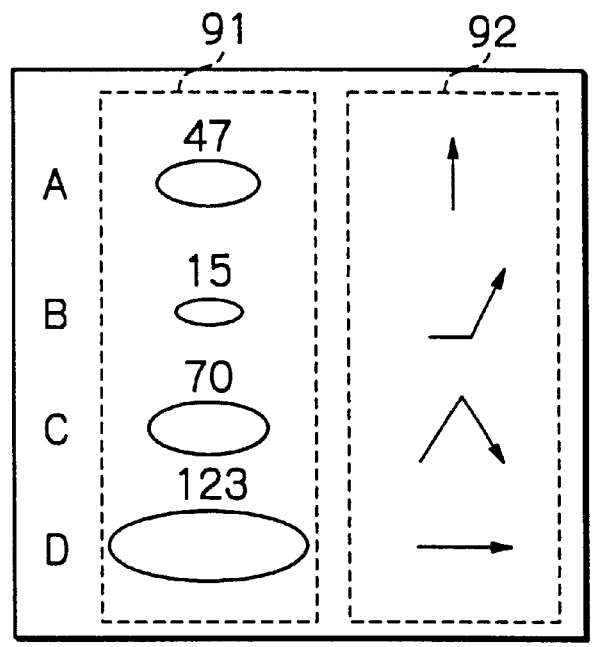

In FIG. 9A, information on patent publications for four applicants (companies) A, B, C and D are depicted in one cell. In this case, ellipses showing the number of patent publications are used instead of circles. Note that "A", "B", "C" and "D" can be countries for which one applicant has filled patent publications. Also, "A", "B", "C" and "D" can be technical ranks. For example, "A" designates most important patent information, "B" designates second most important patent information, "C" designates ordinary patent information, and "D" designates less important patent information. Such technical ranks are given to the database file 11 in advance.

Figure 9B:
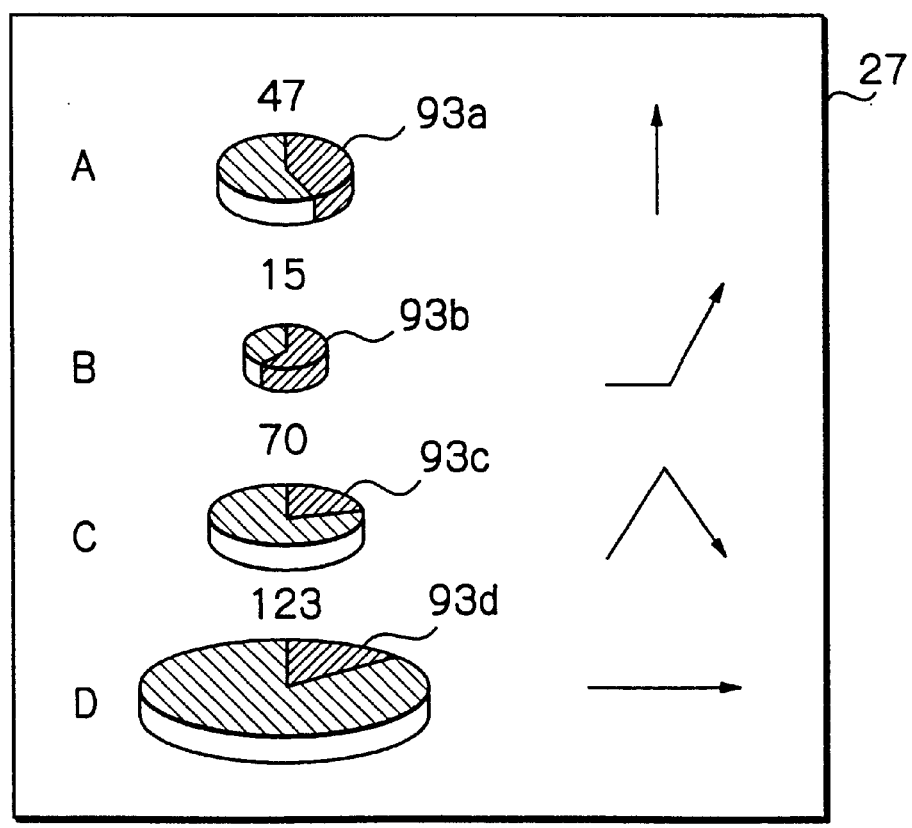

If "A", "B", "C" and "D" designate technical ranks, the ratio of a specific applicant (company) can be illustrated by 93a, 93b, 93c and 93d in FIG. 9B.

In FIG. 9B, although pi-chart-type perspective circular plates are illustrated, other pi-chart-type circles or ellipses, or the like can be used.

Figure 10:
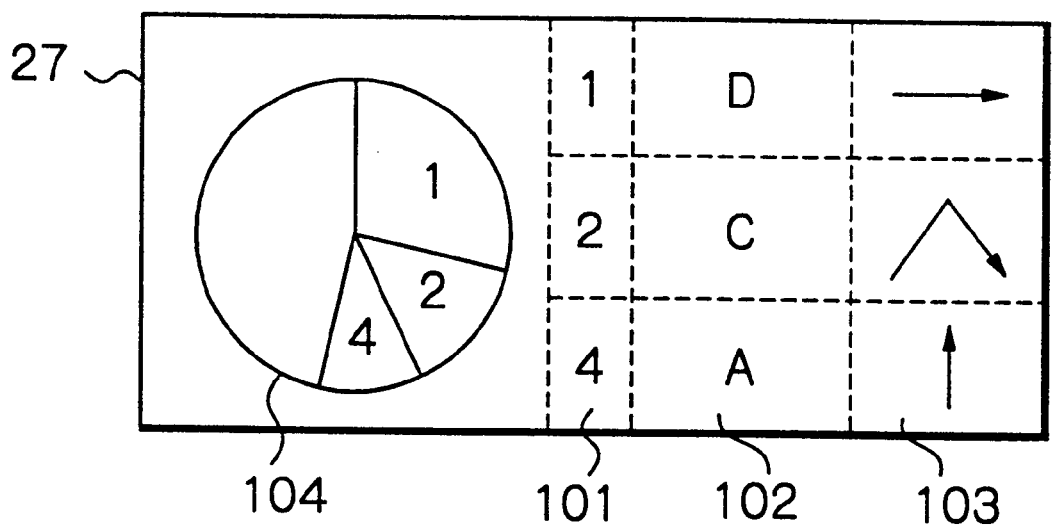

If "A", "B", "C" and "D" designate applicants (companies), the ratio of each applicant can be depicted in one cell as illustrated in FIG. 10. In this case, since the number of applicants is caused to be 3, the applicant "B" is omitted. Also, although a company other than the companies "A", "B", "C" and "D" is ranked "3", such a company is also omitted.

Figure 11B:
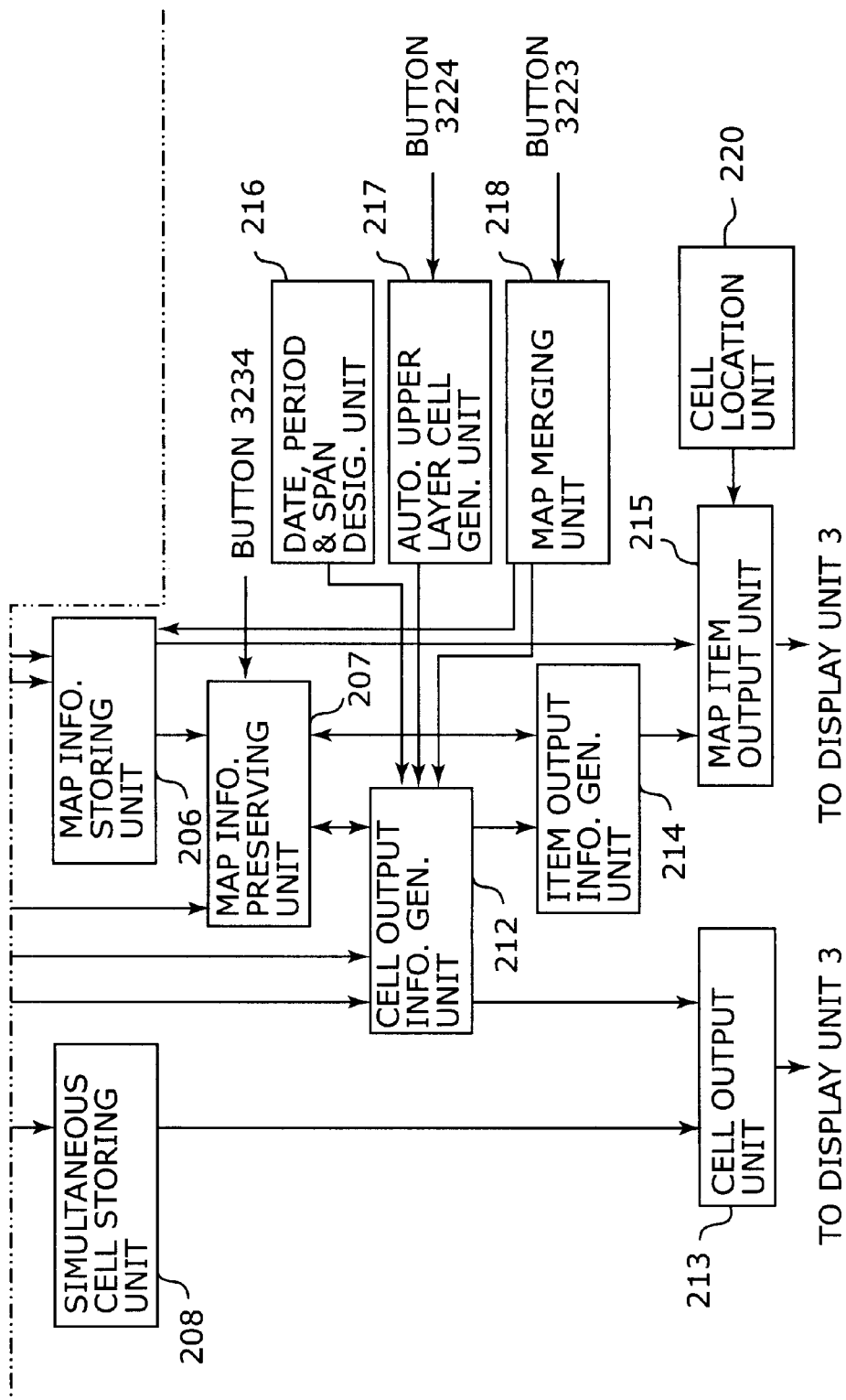
FIG. 11 is a detailed block circuit diagram of the client personal computer of FIG. 3.

In FIG. 11, which is a detailed block circuit diagram of the client personal computer 2 of FIG. 3, a retrieval execution command input unit 201 and a cell input unit 202 is connected to the retrieval execution unit 12. The retrieval execution command input unit 201 is operated by the all-cell retrieval button 3221 and the selective cell retrieval button 322 of the button image 32-2. The cell input unit 202 is operated by the cell retrieval condition set button 3214, and is also connected to a row/column item input unit 203 operated by the map style set button 3212 of the button image 32-1.

Also, a number designating unit 204 is operated by the number designate button 3215 of the button image 32-1, thus designating a text information.

Temporary memory units 205, 206, 207 and 208 are provided. That is, the memory unit 205 is a publication number storing unit, the memory unit 206 is a map information storing unit, the memory unit 207 is a map information preserving unit, and the memory unit 208 is simultaneous cell number storing unit. In this case, the storing units 205, 206 and 208 are constructed by random access memories (RAMs), and the preserving unit 207 is constructed by a hard disk unit.

A between-cell calculating unit 209 operated by the between-cell calculate button 3225 of the button image 32-2 is connected to the publication number storing unit 205. Also, an automatic document extracting unit 210 operated by the automatic document extract button 3226 of the button image 32-2 is connected to the publication number storing unit 205. Further, a publication selecting unit 211 operated by the publication display button 3233 of the button image 32-3.

A cell output information generating unit 212 is connected to the retrieval execution unit 12, the publication number storing unit 205 and the map information preserving unit 207. The simultaneous cell number storing unit 208 and the cell output information generating unit 212 are connected to a cell output unit 213 for displaying cells on the display unit 3.

Also, an item output information generating unit 214 is connected to the cell output information generating unit 212 and the map information preserving unit 207, in order to generate the total number of patent publications at the items in the row direction and at the items in the column direction of the map image 31-1 of the display unit 3. The item output information generating unit 214 as well as the map information storing unit 207 is connected to a map item output unit 215 for displaying items on the display unit 3.

A date, period and span designating unit 216 is connected to the cell output information generating unit 212. That is, one of a filing date, a publication date and registered date is designated. Also, a period to be retrieved is designated. Further, a span of 1 year or 6 months is designated.

Also, an automatic upper layer cell generating unit 217 operated by the automatic upper layer cell generate button 3224 is connected to the cell output information generating unit 212.

Further, a map merging unit 218 operated by the map merge button 3223 is connected to the map information storing unit 206 and the cell output information generating unit 212.

The map information preserving unit 207 is operated by the map preserve button 3234 to permanently store patent map information generated by the cell output information generating unit 212 and the item output information generating unit 214 even after the power supply is turned OFF.

Figure 12:
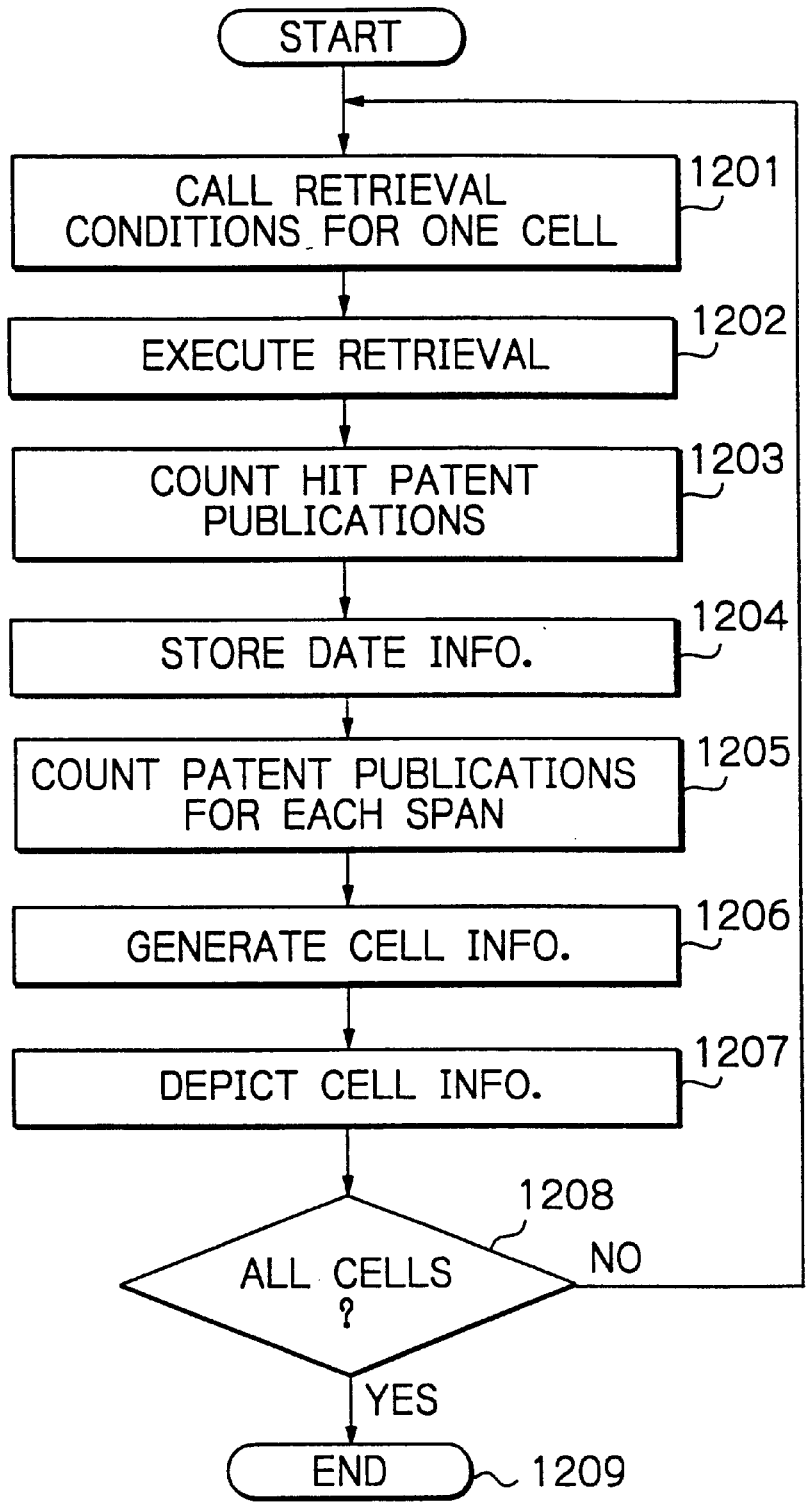
FIG. 12 is a flowchart showing the general operation of the patent database server and the client personal computer of FIG. 11.

The operation of the client personal computer 2 as well as the patent database server 1 of FIG. 11 will be explained next with reference to a general flowchart as shown in FIG. 12.

First, at step 1201, the retrieval execution unit 12 calls retrieval conditions from the retrieval execution command input unit 201 and the cell input unit 202. Thus, one cell is selected.

Next, at step 1202, the retrieval execution unit 12 performs a retrieval upon the database file 11 in accordance with the retrieval conditions of the selected cell. Then, the retrieval result is forwarded to the cell output information generating unit 212.

Next, at step 1203, the cell output information generating unit 212 counts hit patent publications.

Next, at step 1204, the cell output information generating unit 212 stores data information of the hit patent publications, such as filing date information.

Next, at step 1205, the cell output information generating unit 212 counts the patent publications for each span, i.e., 1 year or 6 months, in accordance with the date information.

Next, at step 1206, the cell output information generating unit 212 calculates the total number of the patent publications for a predetermined period and the tendency of patent publications to increase or decrease for each span. That is, cell information for the selected cell is generated and forwarded to the cell output unit 213.

Next, at step 1207, the cell output unit 213 depicts the cell information on a corresponding location of the display unit 3.

Step 1208 repeats the control at steps 1201 through 1207 for all the cells to be retrieved.

The routine of FIG. 12 is completed by step 1209.

The elements of the client personal computer 2 will be explained in detail.

Figure 13:
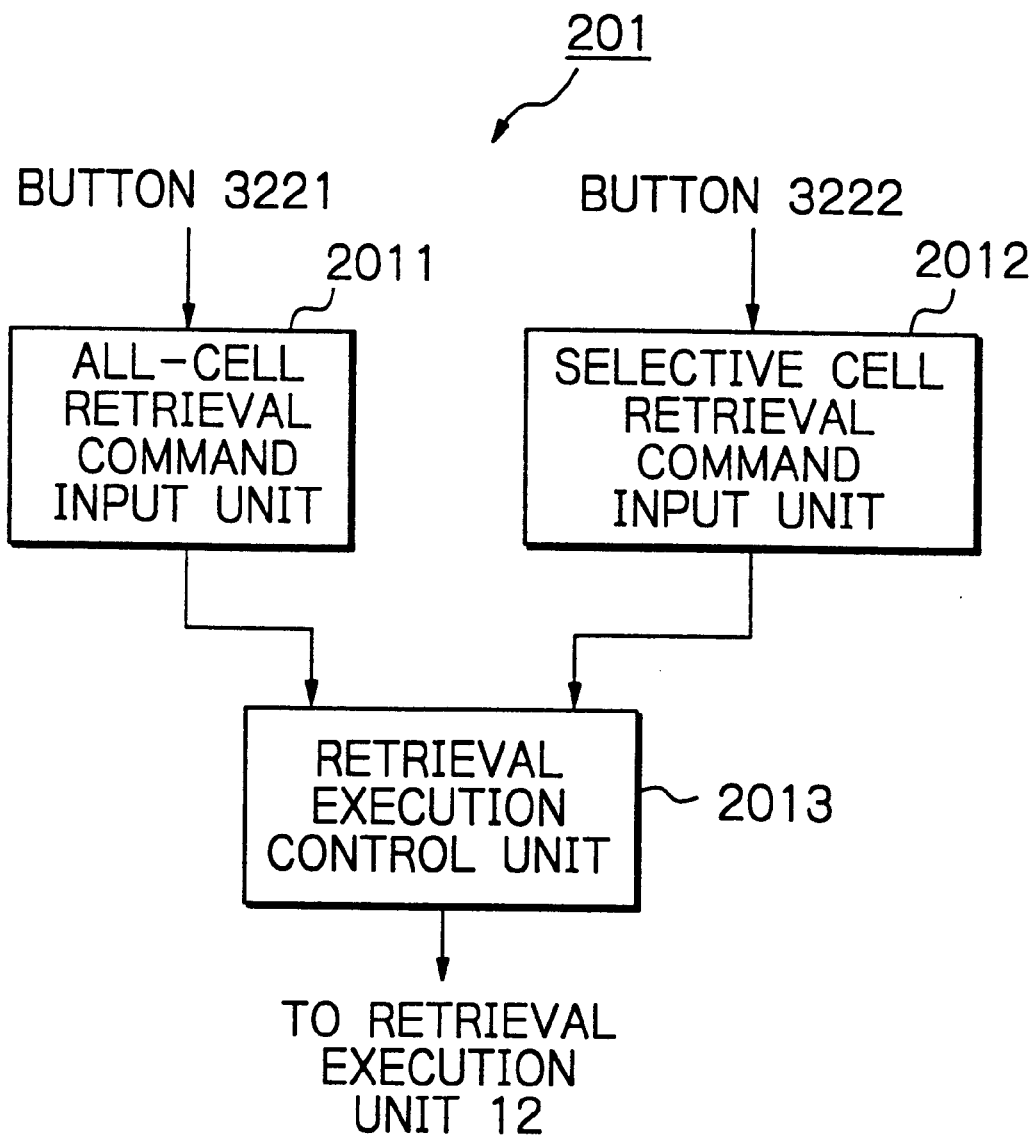
FIG. 13 is a block circuit diagram of the retrieval execution command input unit of FIG. 11.

In FIG. 13, which is a detailed block circuit diagram of the retrieval execution command input unit 201 of FIG. 11, an all-cell retrieval execution command input unit 2011 is operated by the all-cell retrieval button 3221, and a selective cell retrieval command input unit 2012 is operated by the selective cell retrieval button 3222. In this case, only one of the all-cell retrieval command input unit 2011 and the selective cell retrieval command input unit 2012 is operated, so that a retrieval execution control unit 2013 generates either an all-cell retrieval command or a selective cell retrieval command and transmits it to the retrieval execution unit 12.

Figure 14A:
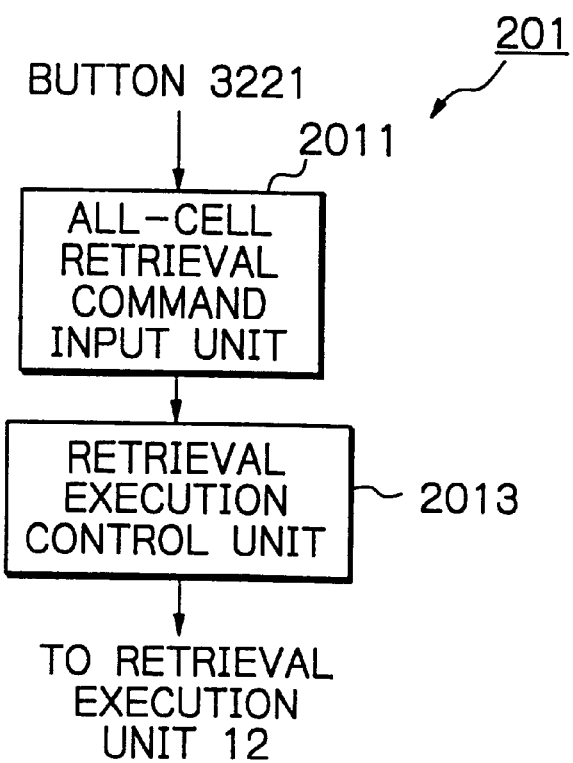
FIGS. 14A and 14B are block circuit diagrams of modifications to the retrieval execution command input unit of FIG. 13.
Figure 14B:
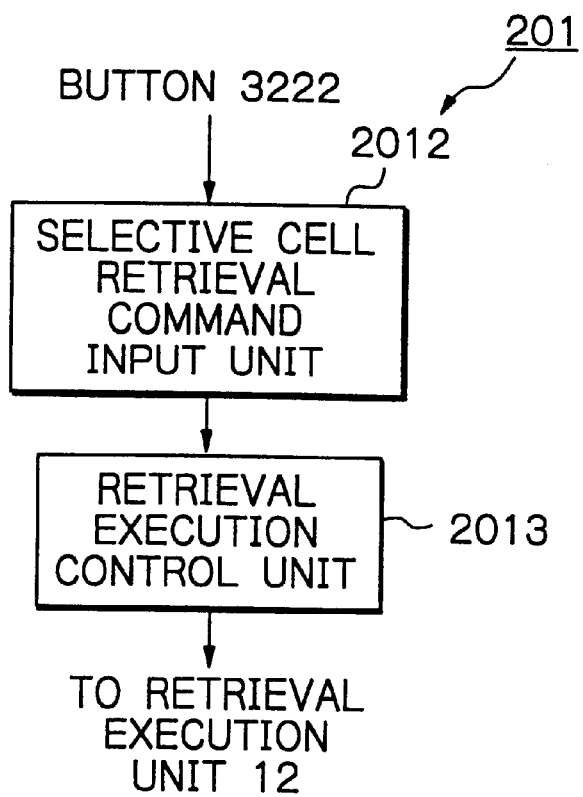

Note that, as illustrated in FIGS. 14A and 14B, it is possible to provide only one of the all-cell retrieval execution command input unit 2011 and the selective-cell retrieval execution command input unit 2012.

Figure 15:
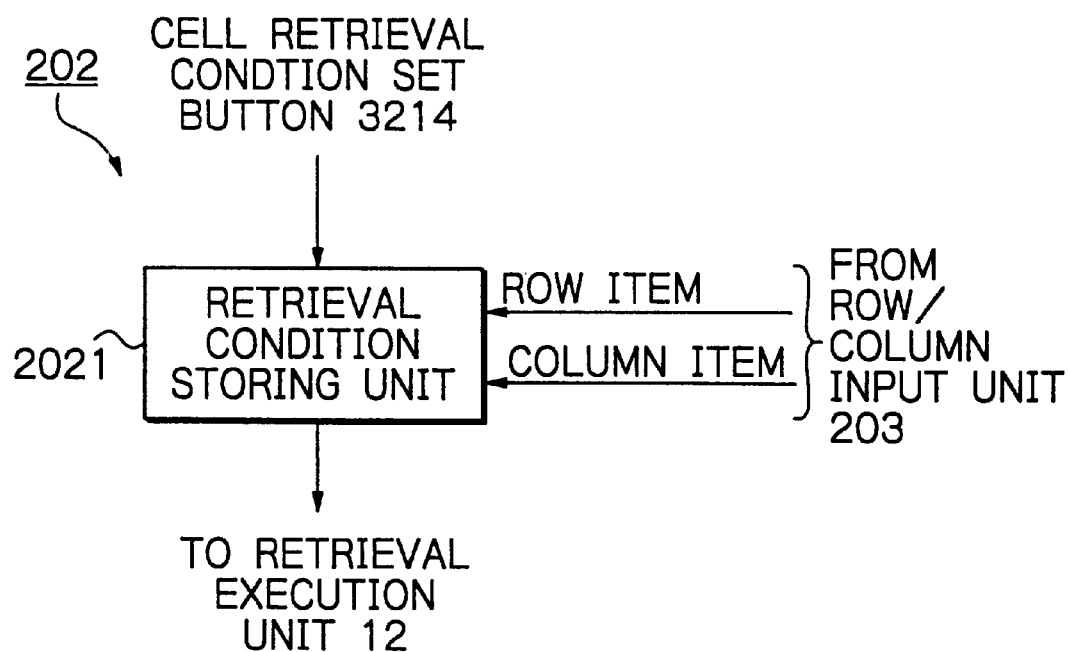
FIG. 15 is a block circuit diagram of the cell input unit of FIG. 11.

In FIG. 15, which is a detailed block circuit diagram of the cell input unit 202 of FIG. 11, a retrieval condition storing unit 2021 is provided. The retrieval condition storing unit 2021 is operated by the cell retrieval condition set button 3214 to receive a row item and a column item from the row/column input unit 203. Thus, one cell is selected, and a selected cell is forwarded to the retrieval execution unit 12.

Figure 16A:
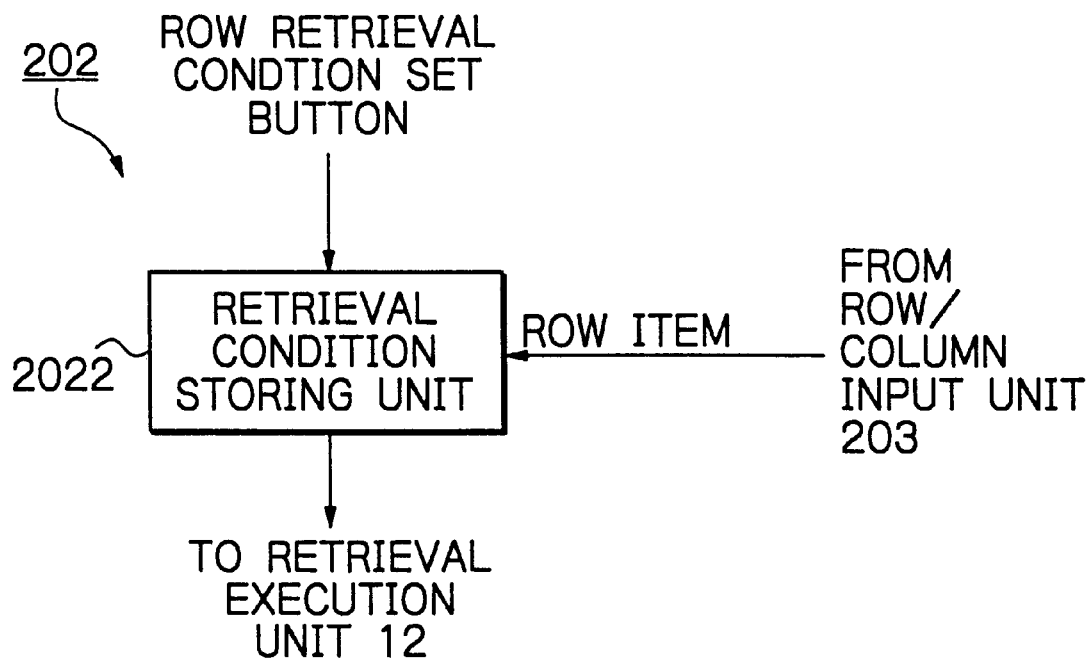
FIGS. 16A and 16B are block circuit diagrams of modifications to the cell input unit of FIG. 15.

In FIG. 16A, which illustrates a modification of the cell input unit 202 of FIG. 15, the cell input unit 202 is modified to a row input unit. In this case, a retrieval condition storing unit 2022 is operated by a row retrieval condition set button to receive a row item from the row/column input unit 203. Thus, one row is selected, and a selected row is forwarded to the retrieval execution unit 12.

Figure 16B:
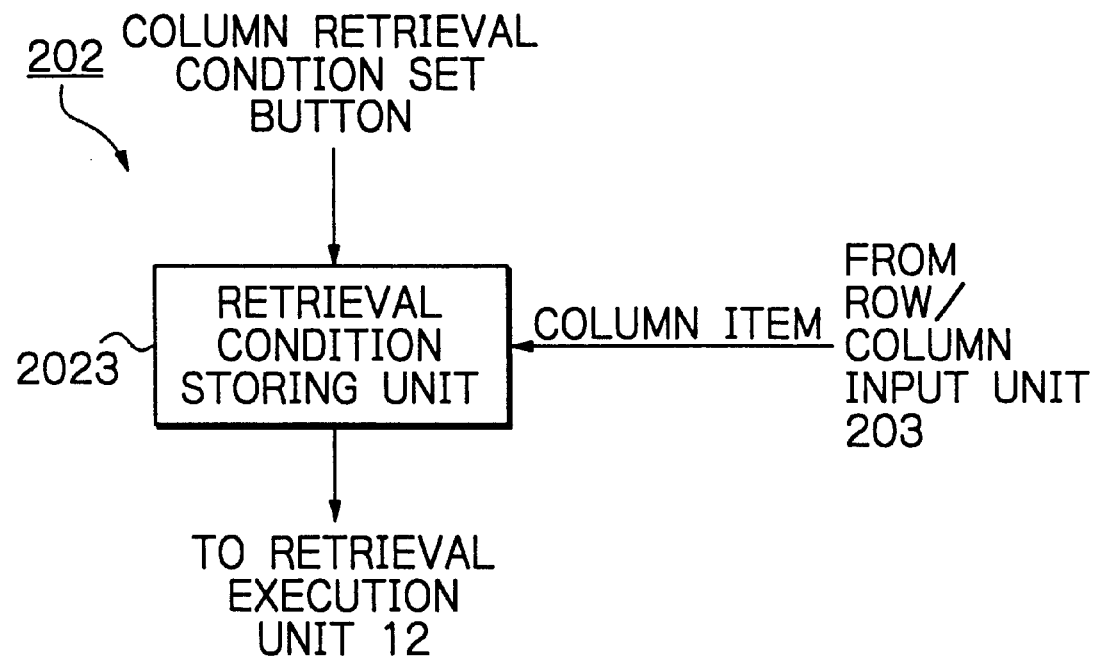

In FIG. 16B, which illustrates another modification of the cell input unit 202 of FIG. 15, the cell input unit 202 is modified to a column input unit. In this case, a retrieval condition storing unit 2023 is operated by a column retrieval condition set button to receive a column item from the row/column input unit 203. Thus, one column is selected, and a selected column is forwarded to the retrieval execution unit 12.

In FIG. 17, which is a detailed block circuit diagram of the cell output information generating unit 212 of FIG. 11, when the retrieval execution unit 12 completes a retrieval operation, counters 2121 and 2122 are operated.

Since the publication number storing unit 205 stores publication numbers for each of the cells, the counter 2121 counts patent publications for each of the cells. If the number of patent publications is required for each applicant (company) or technical rank as illustrated in FIG. 9A, the counter 2121 counts patent publications for each applicant (company) or technical rank. The counted number of patent publications can be stored in the map information preserving unit 207. The counted number of patent publications is forwarded to a numeral-to-circle conversion unit 2123 to generate a circle having a diameter corresponding to the counted number of patent publications. This circle is forwarded to a circle output unit 2124. Also, the counted number of patent publications is forwarded to a numeral output unit 2125.

On the other hand, the counter 2122 counts patent publications for each span of each of the cells. If the number of patent publications is required for each applicant (company) or technical rank as illustrated in FIG. 9A, the counter 2122 counts patent publications for each applicant (company) or technical rank. The counted number of patent publications can be stored in the map information preserving unit 207. The counted number of patent publications is forwarded to a tendency determining unit 2126 to generate an arrow showing the tendency of patent publications to increase or decrease. This arrow is forwarded to an arrow output unit 2127.

When the numbers of patent publications counted by the counters 2121 and 2122 are stored in the map information preserving unit 207, the counted numbers of patent publications are forwarded to the numeral-to-circle conversion unit 2123, the numeral output unit 2125 and the tendency determining unit 2126.

The operation of the tendency determining unit 2126 of FIG. 17 is explained next with reference to FIG. 18.

First, at step 1801, i is initialized to be 1.

Next, at step 1802, it is determined whether or not $N_{i+1}$ is larger than $N_i$. Note that $N_i$ is the number of patent publications for an i-th span (1 year or 6 months) and $N_{i+1}$ is the number of patent publications for an (i+1)-th span next to the i-th span.

At step 1802, if $N_{i+1} > N_i$, the control proceeds to step 1803 which allocates (+) to a sign pattern. Otherwise, the control proceeds to step 1804 which allocates (−) to the sign pattern.

Next, at step 1805, the value i is increased by 1, and at step 1806, it is determined whether or not $i \geq i_{max}$ is satisfied. Note that a value $i_{max}$ is the number of spans of a selected cell. If $i < i_{max}$, the control at steps 1802 through 1805 is repeated. On the other hand, if $i \geq i_{max}$, the control proceeds to step 1807.

Figure 19:
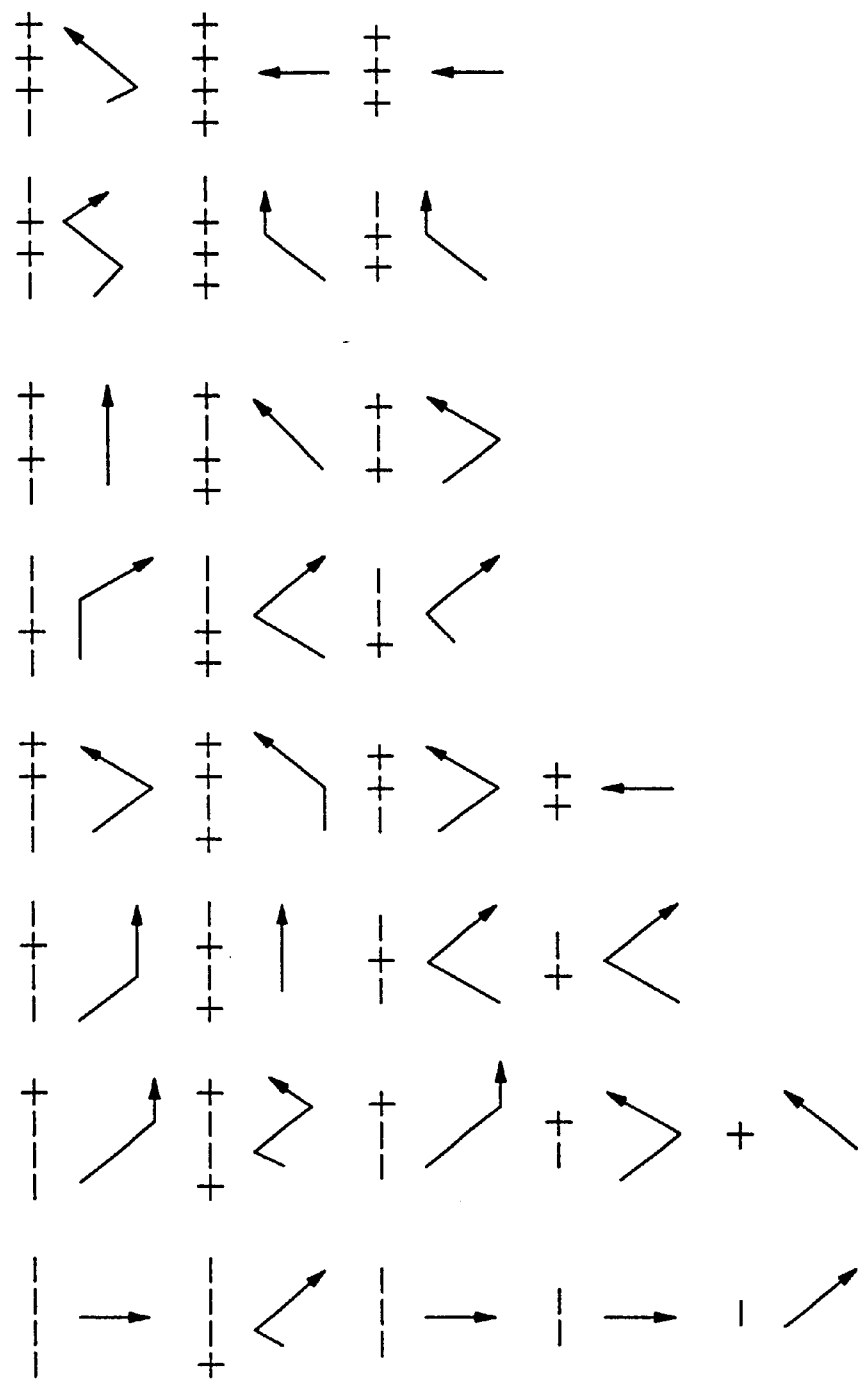
FIGS. 19A, 19B, 19C and 19D are diagrams showing arrows used in the flowchart of FIG. 18.

At step 1807, an arrow pattern is read out of a read-only memory (ROM) (not shown) using the sign pattern as a parameter. Note that the ROM stores arrow patterns as illustrated in FIGS. 19A, 19B, 19C and 19D, where FIG. 19A shows arrow patterns, when $i_{max}=5$, FIG. 19B shows arrow patterns when $i_{max}=4$, FIG. 19C shows arrow patterns when $i_{max}=3$, and FIG. 19D shows arrow patterns when $i_{max}=2$.

Next, at step 1808, the read arrow pattern is output to the arrow output unit 2127.

Figure 18:
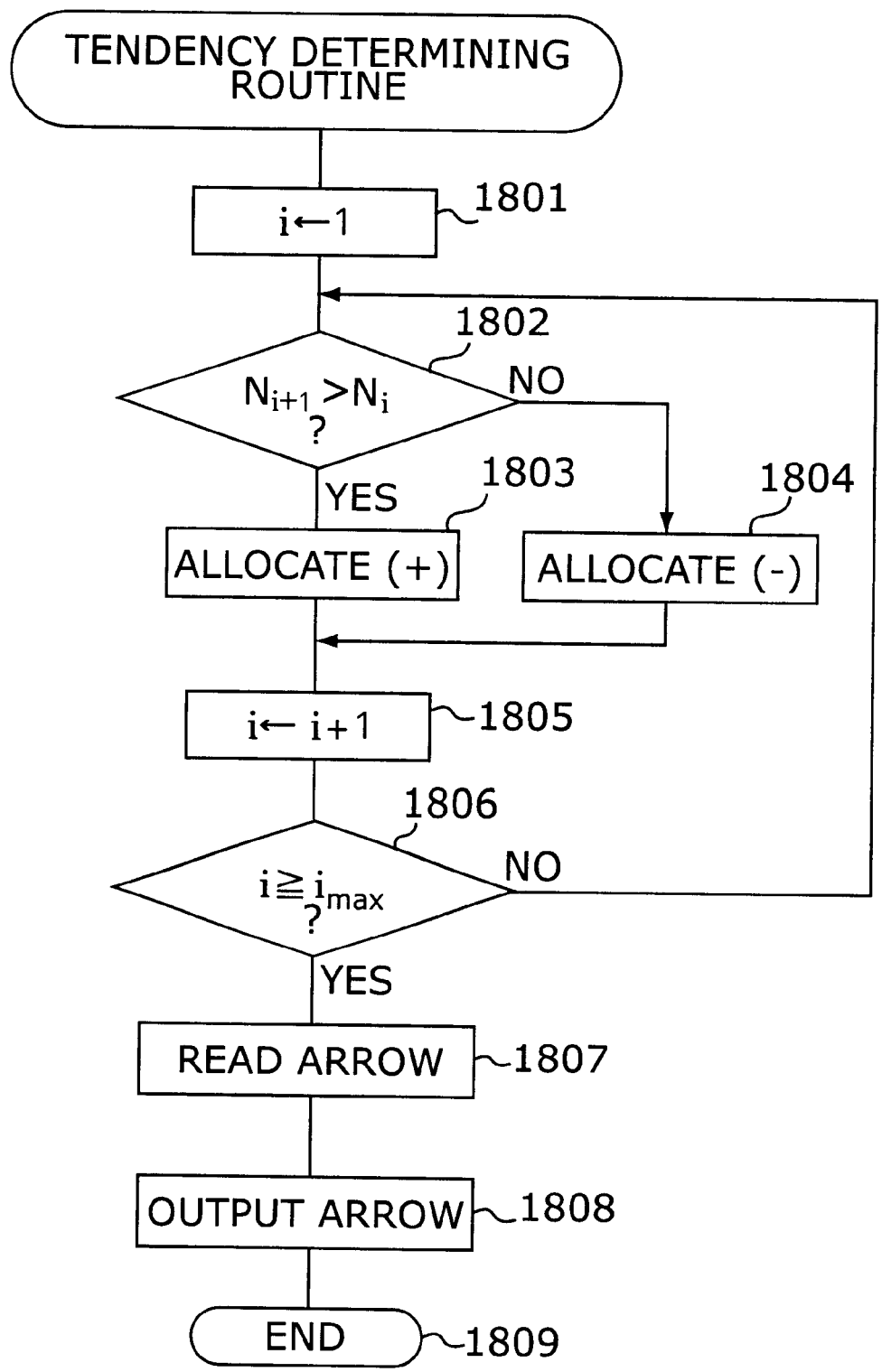
FIG. 18 is a flowchart showing the operation of the tendency determining unit of FIG. 17.

Then, the flowchart of FIG. 18 is completed by step 1809.

Figure 20:
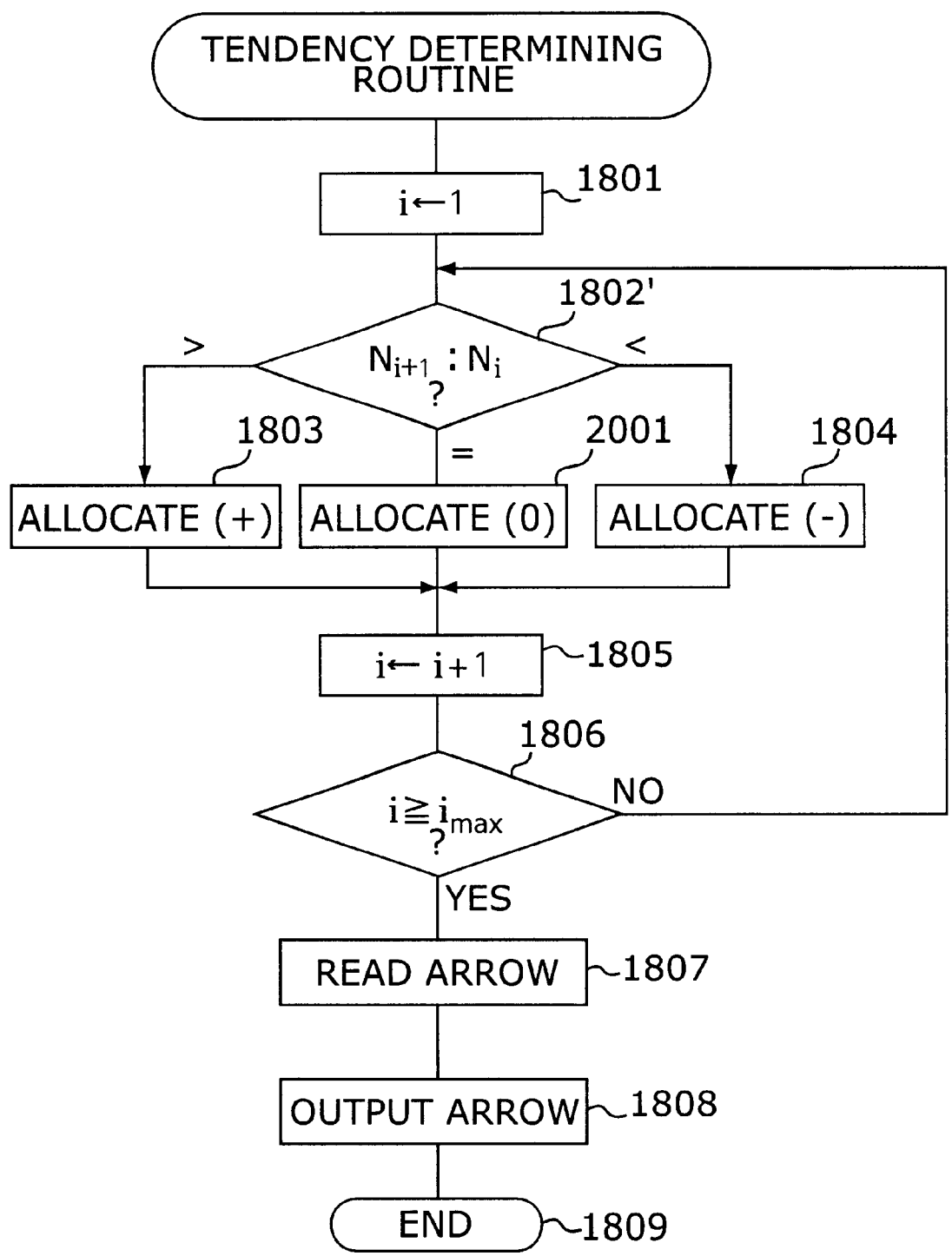
FIG. 20 is a flowchart of a modification to the flowchart of FIG. 18.
Figure 21:
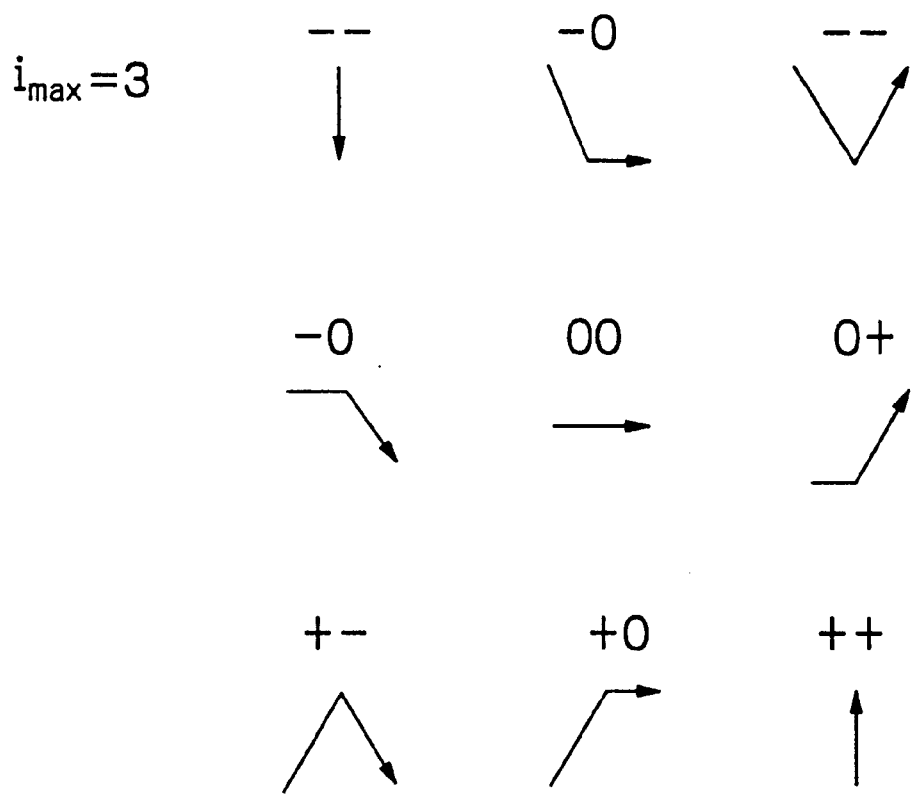
FIG. 21 is a diagram showing arrows used in the flowchart of FIG. 20.

In FIG. 20, which is a modification of the flowchart of FIG. 18, step 1802 of FIG. 18 is modified to step 1802' which compares $N_{i+1}$ with $N_i$. Also, step 2001 is added. Therefore, at step 1802', if $N_{i+1} > N_i$, the control proceeds to step 1803 which allocates (+) to the sign pattern. If $N_{i+1}=N_i$, the control proceeds to step 2001 which allocates (0) to the sign pattern. If $N_{i+1}<N_i$, the control proceeds to step 1804 which allocates (−) to the sign pattern. In this case, the ROM stores arrow patterns as illustrated in FIG. 21 where $N_{max}=3$.

Figure 22:
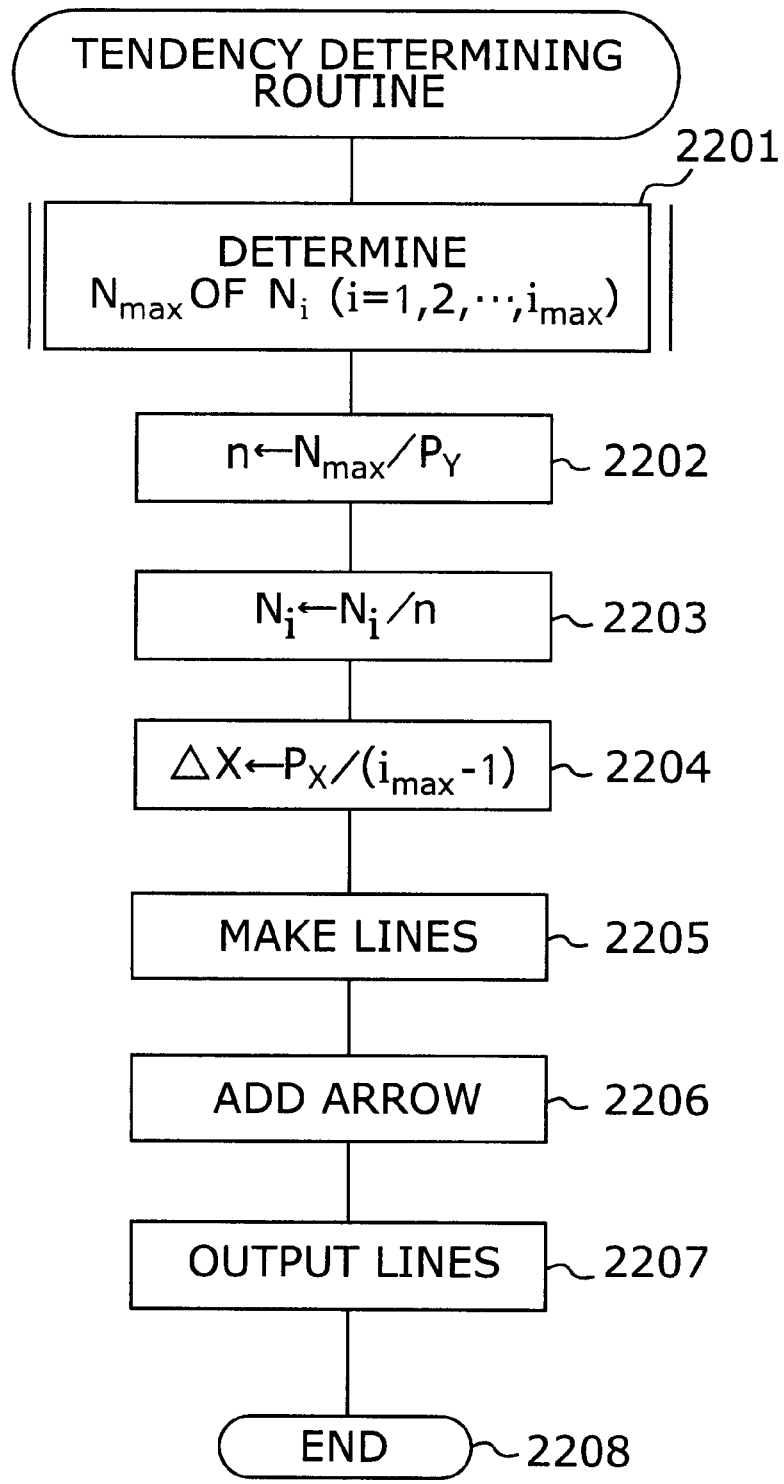
FIG. 22 is a flowchart showing the operation of the tendency determining unit of FIG. 17.

The operation of the tendency determining unit 2126 of FIG. 17 is explained next with reference to FIG. 22. The flowchart of FIG. 22 is used for generating a line graph as illustrated in FIG. 7D. In this case, note that the arrow output unit 2127 is modified to a line output unit.

First, at step 2201, a maximum number $N_{max}$ is selected from the numbers $N_1, N_2, \ldots, N_{imax}$.

Figure 23:
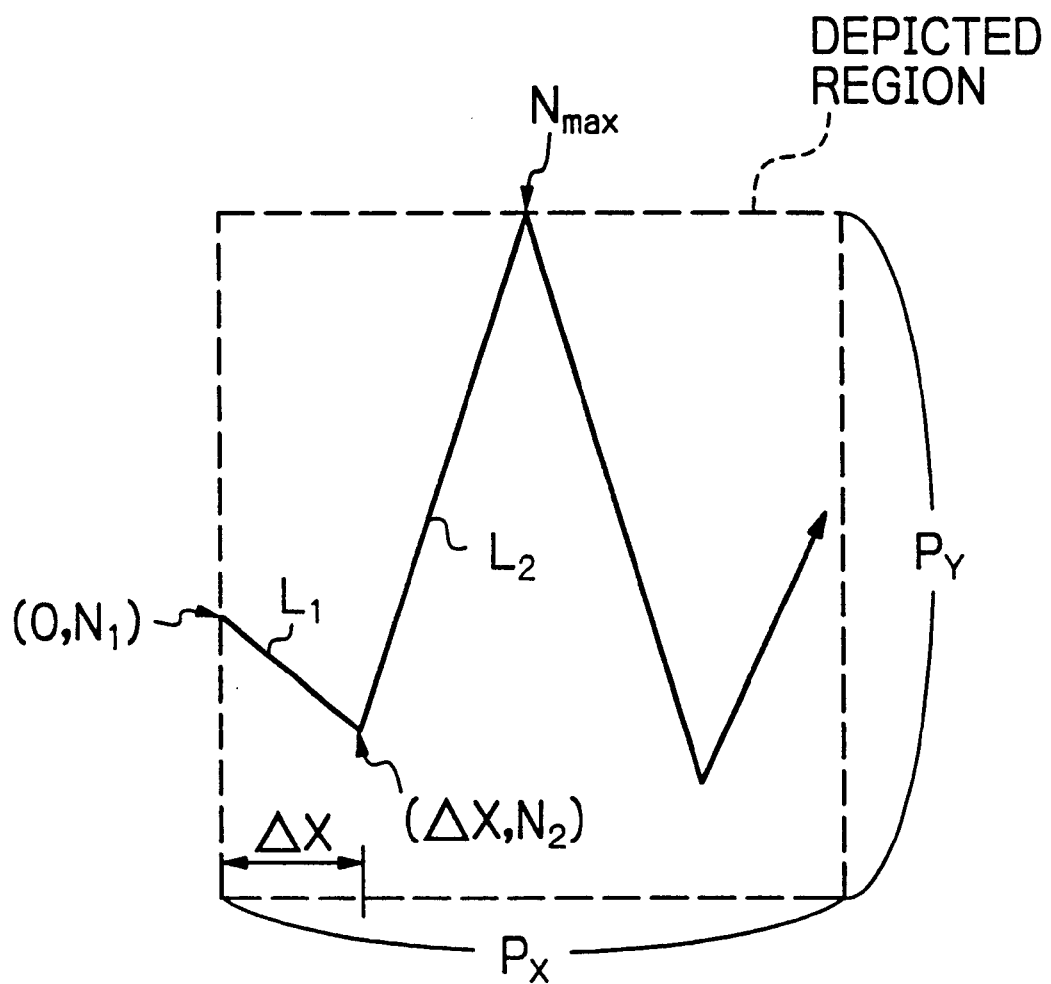
FIG. 23 is a diagram showing lines used in the flowchart of FIG. 22.

Next, at step 2201, the number n of patent publications per one pixel in the Y direction is calculated by $$n \leftarrow N_{max}/P_Y$$

where $P_Y$ is the number of pixels of a depicted region in the Y direction as shown in FIG. 23.

Next, at step 2203, the number $N_i$ of the spans of a selected cell is normalized by $$N_i \leftarrow N_1/n.$$

Next, at step 2204, a length $\Delta X$ per span is calculated by $$\Delta X \leftarrow P_x/(i_{max}-1)$$

where $P_x$ is the number of pixels of the depicted region as shown in FIG. 23.

Next, at step 2205, lines $L_1, L_2, \ldots$ linking coordinates $(0, N_1), (\Delta X, N_2) \ldots$ are produced as shown in FIG. 23.

Next, at step 2206, an arrow is added to the last line.

Next, at step 2207, the lines $L_1, L_2, \ldots$ along with the arrow are output to the line output unit.

Thus, the flowchart of FIG. 22 is completed by step 2208.

Figure 24:
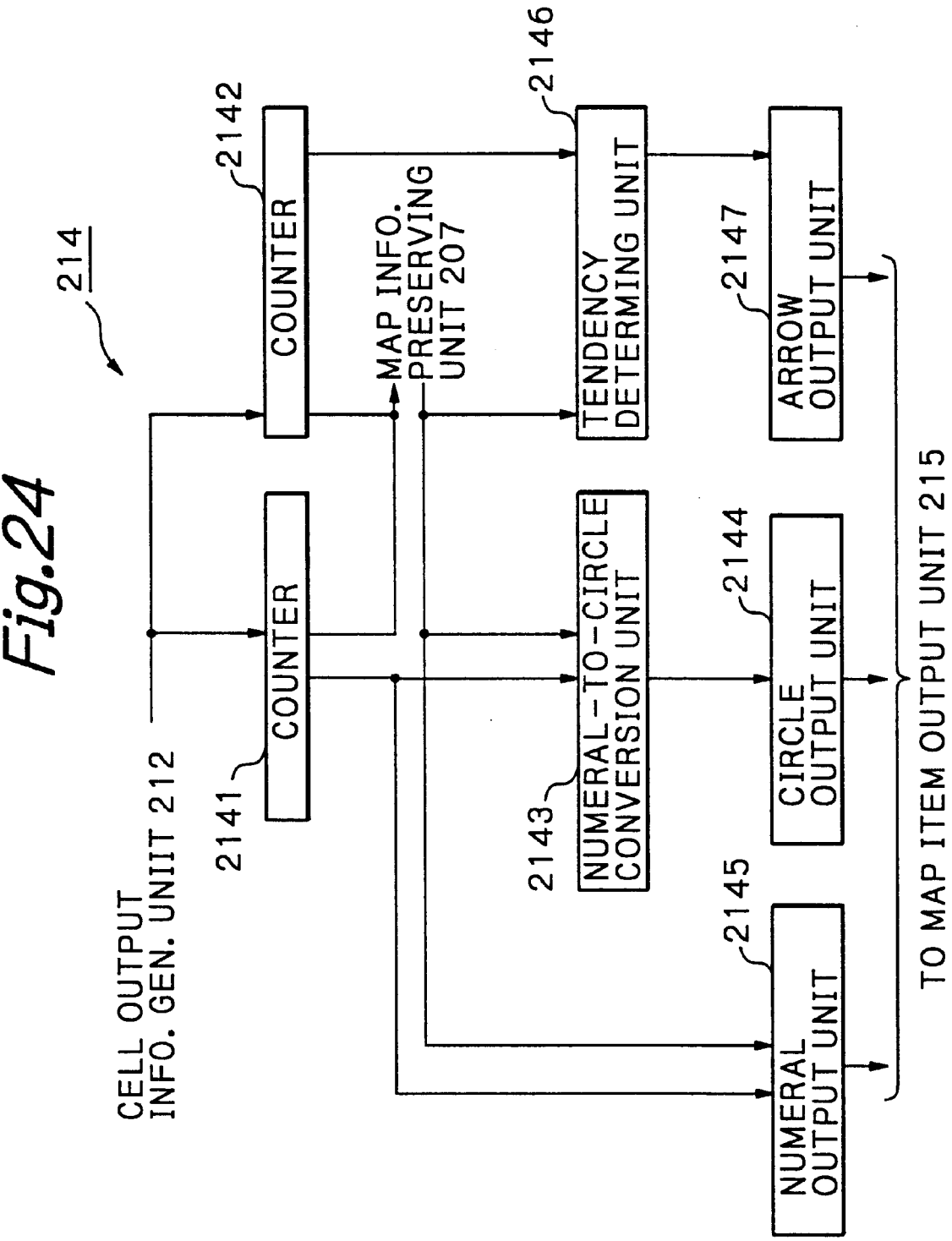
FIG. 24 is a detailed block circuit diagram of the item output information generating unit of FIG. 11.

In FIG. 24, which is a detailed block circuit diagram of the item output information generating unit 214 of FIG. 11, when the cell output information generating unit 212 completes its operation, counters 2141 and 2142 are operated.

The counter 2141 counts patent publications for each of the rows and the columns of the cells. If the number of patent publications is required for each applicant (company) or technical rank as illustrated in FIG. 9A, the counter 2121 counts patent publications for each applicant (company) or technical rank. The counted number of patent publications can be stored in the map information preserving unit 207. The counted number of patent publications is forwarded to a numeral-to-circle conversion unit 2143 to generate a circle having a diameter corresponding to the counted number of patent publications. This circle is forwarded to a circle output unit 2144. Also, the counted number of patent publications is forwarded to a numeral output unit 2145.

On the other hand, the counter 2142 counts patent publications for each span of each of the rows and the columns of the cells. If the number of patent publications is required for each applicant (company) or technical rank as illustrated in FIG. 9A, the counter 2142 counts patent publications for each applicant (company) or technical rank. The counted number of patent publications can be stored in the map information preserving unit 207. The counted number of patent application is forwarded to a tendency determining unit 2146 to generate an arrow showing the tendency of patent publications to increase or decrease. This arrow is forwarded to an arrow output unit 2147.

FIGS. 25A, 25B, 25C, 25D 25E and 25F are detailed block circuit digrams of the cell output unit 213 of FIG. 11.

Figure 25:
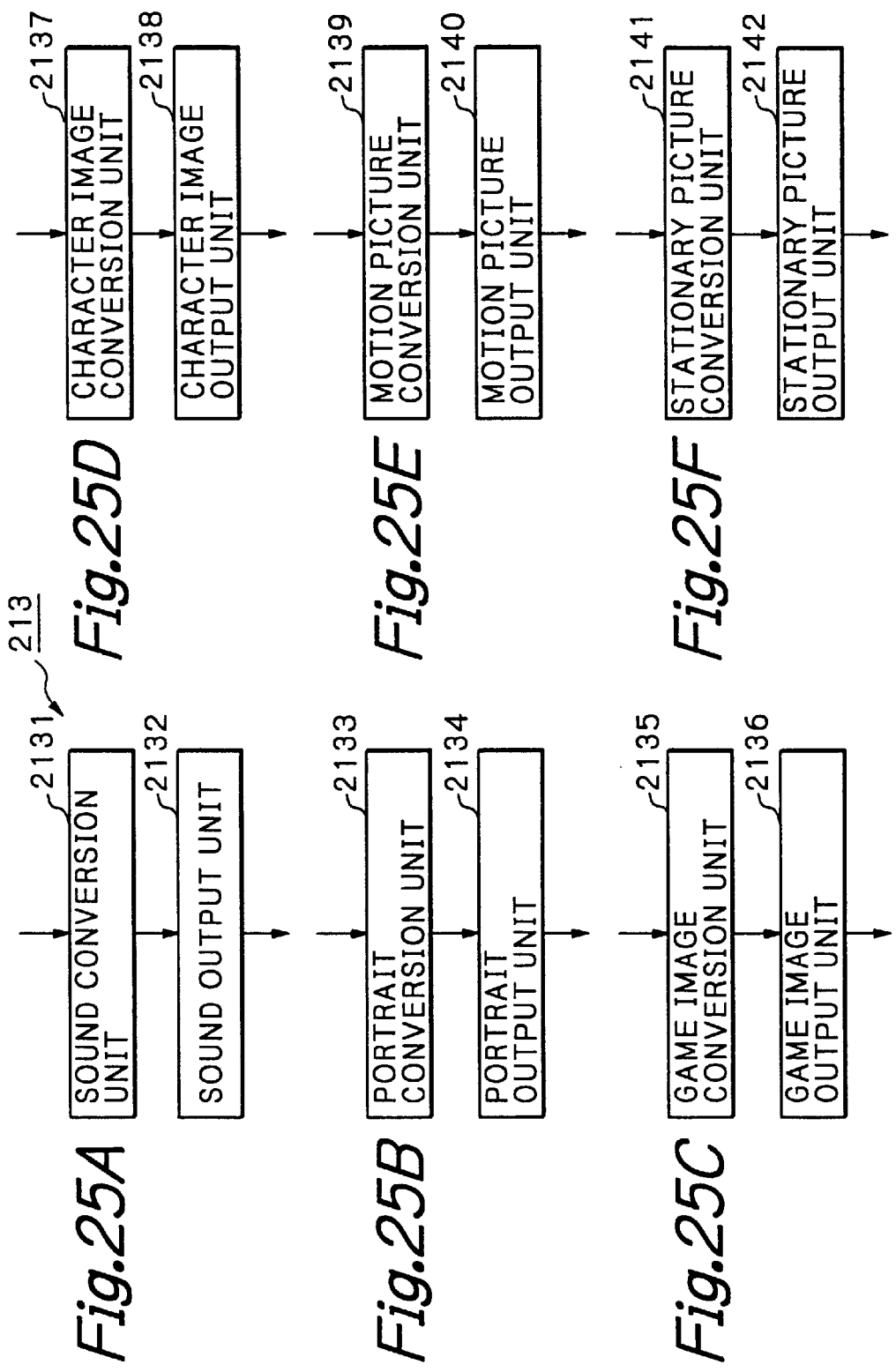
FIGS. 25A, 25B, 25C, 25D, 25E and 25F are block circuit diagrams of the cell output unit of FIG. 11.

In FIG. 25A, a sound conversion unit 2131 is provided to produce various kinds of sound signals in accordance with the tendency of patent publication to increase or decrease, and a sound output unit 2132 is provided to receive a sound signal from the sound conversion unit 2131 to generate a sound. As a result, the tendency of patent publications to increase or decrease can be audibly indicated.

In FIG. 25B, a portrait conversion unit 2133 is provided to produce various kinds of portrait signals in accordance with the tendency of patent publications to increase or decrease, and a portrait output unit 2134 is provided to receive a portrait signal from the portrait conversion unit 2133 to generate a portrait. For example, if the number of patent publications for a selected cell is remarkably decreasing, a delighted portrait is generated. As a result, the tendency of patent publications to increase or decrease can be visually indicated.

In FIG. 25C, a game image conversion unit 2135 is provided to produce various kinds of game image signals in accordance with the tendency of patent publications to increase or decrease, and a game image output unit 2136 is provided to receive a game image signal from the game image conversion unit 2135 to generate a game image. As a result, the tendency of patent publications to increase or decrease can again be visually indicated.

In FIG. 25D, a character image conversion unit 2137 is provided to produce various kinds of character image signals in accordance with the tendency of patent publications to increase or decrease, and a character image output unit 2138 is provided to receive a character image signal from the character image conversion unit 2137 to generate a character image. As a result, the tendency of patent publications to increase or decrease can again be visually indicated.

In FIG. 25E, a motion picture conversion unit 2139 is provided to produce various kinds of motion picture signals in accordance with the tendency of patent publications to increase or decrease, and a motion picture output unit 2140 is provided to receive a motion picture signal from the motion picture conversion unit 2139 to generate a motion picture. As a result, the tendency of patent publications to increase or decrease can again be visually indicated.

In FIG. 25F, a stationary picture conversion unit 2141 is provided to produce various kinds of stationary picture signals in accordance with the tendency of patent publications to increase or decrease, and a stationary picture output unit 2142 is provided to receive a stationary picture signal from the stationary picture conversion unit 2141 to generate a stationary picture. As a result, the tendency of patent publications to increase or decrease can again be visually indicated.

Figure 26:
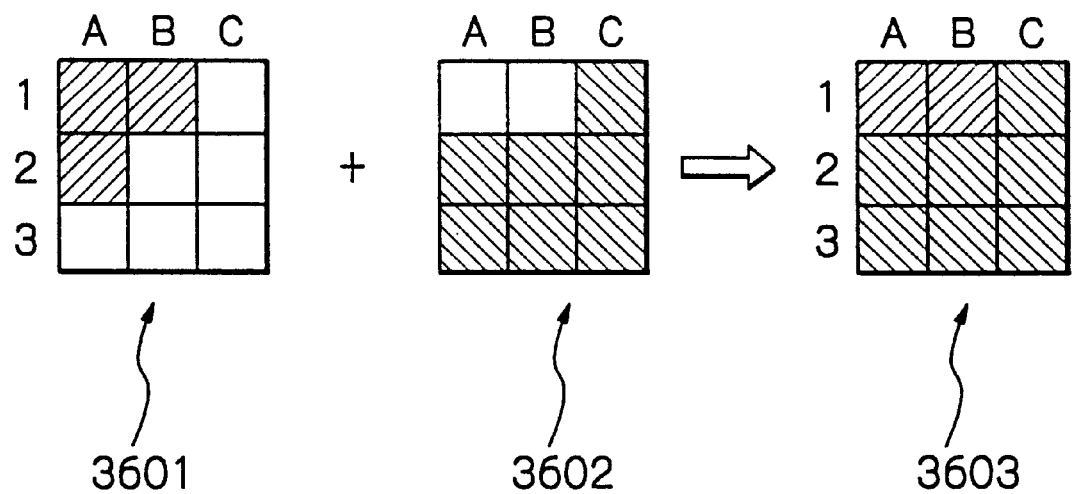
FIG. 26 is a diagram for explaining the operation of the map merging unit of FIG. 11.

FIG. 26 is a diagram for explaining the merge operation by the map merging unit 218 of FIG. 11. That is, when the map merging unit 218 is operated by the map merge button 3223 of FIG. 5, a plurality of patent maps such as two patent maps 3601 and 3602 read from the map information preserving unit 207 are merged into one patent map 3603. In FIG. 26, the patent map 3601 has information at cells (1, A), (1, B) and (2, A) and the patent map 3602 has information at cells (1, C), (2, A), (2, B), (2,C), (3, A), (3, B) and (3, C). As a result, the merged patent map 3603 has information at all the cells. In this case, since both of the patent maps 3601 and 3602 have information at cell (2, A), this is informed to an operator, so that one of the maps 3601 and 3602 is selected for cell (2, A).

Also, in the merging operation, a patent map for a first period such as 1996 and 1997 and a patent map for a second period such as 1998 to 2000 can be easily merged into a patent map for a third period from 1996 to 2000.

Figure 27:
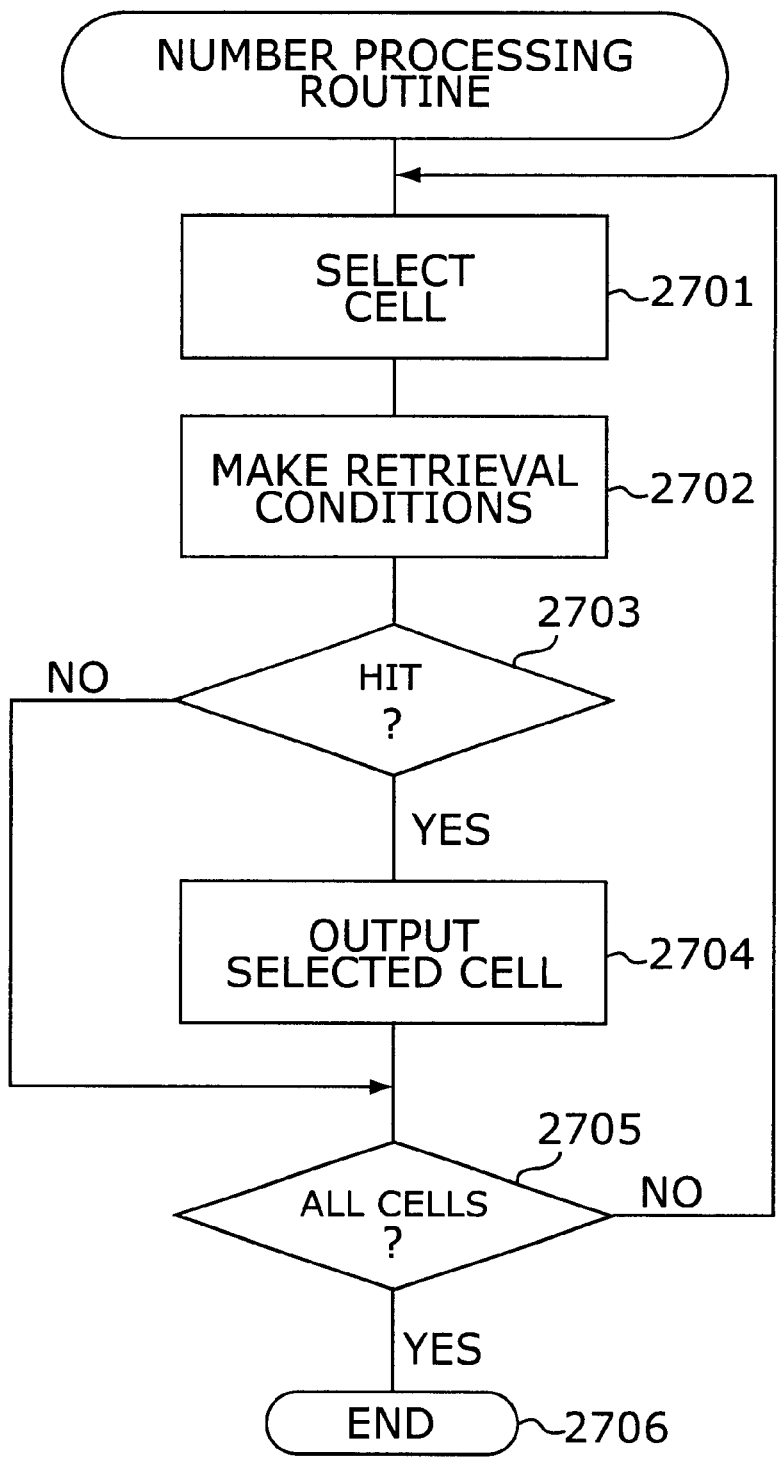
FIG. 27 is a flowchart showing the operation of the retrieval execution unit by the number designating unit of FIG. 11.

The operation of the retrieval execution unit 12 while receiving a patent publication number from the number designating unit 204 is explained next with reference to FIG. 27. The flowchart of FIG. 27 is started by receiving a patent publication number from the number designating unit 204.

First, at step 2701, one cell is selected, i.e., retrieval conditions for one cell are selected.

Next, at step 2702, a retrieval condition is determined by the following AND logic:

the patent publication number AND the retrieval conditions for the selected cell.

Next, at step 2703, a retrieval using the retrieval condition determined at step 2703 is performed upon the database file 11. As a result, if a record having the retrieval condition is hit, the control proceeds to step 2704 which outputs cell information to the cell output information generating unit 212. Otherwise, the control proceeds directly to step 2705.

Step 2705 repeats the control at steps 2701 through 2704 for all the cells.

The flowchart of FIG. 27 is completed at step 2706.

When the cell output information generating unit 212 receives hit cells from the retrieval execution unit 12, the hit cells can be highlighted or displayed in a special color, thus visually indicating the cells to which the patent publication designated by the number designating unit 204 belongs.

Figure 28:
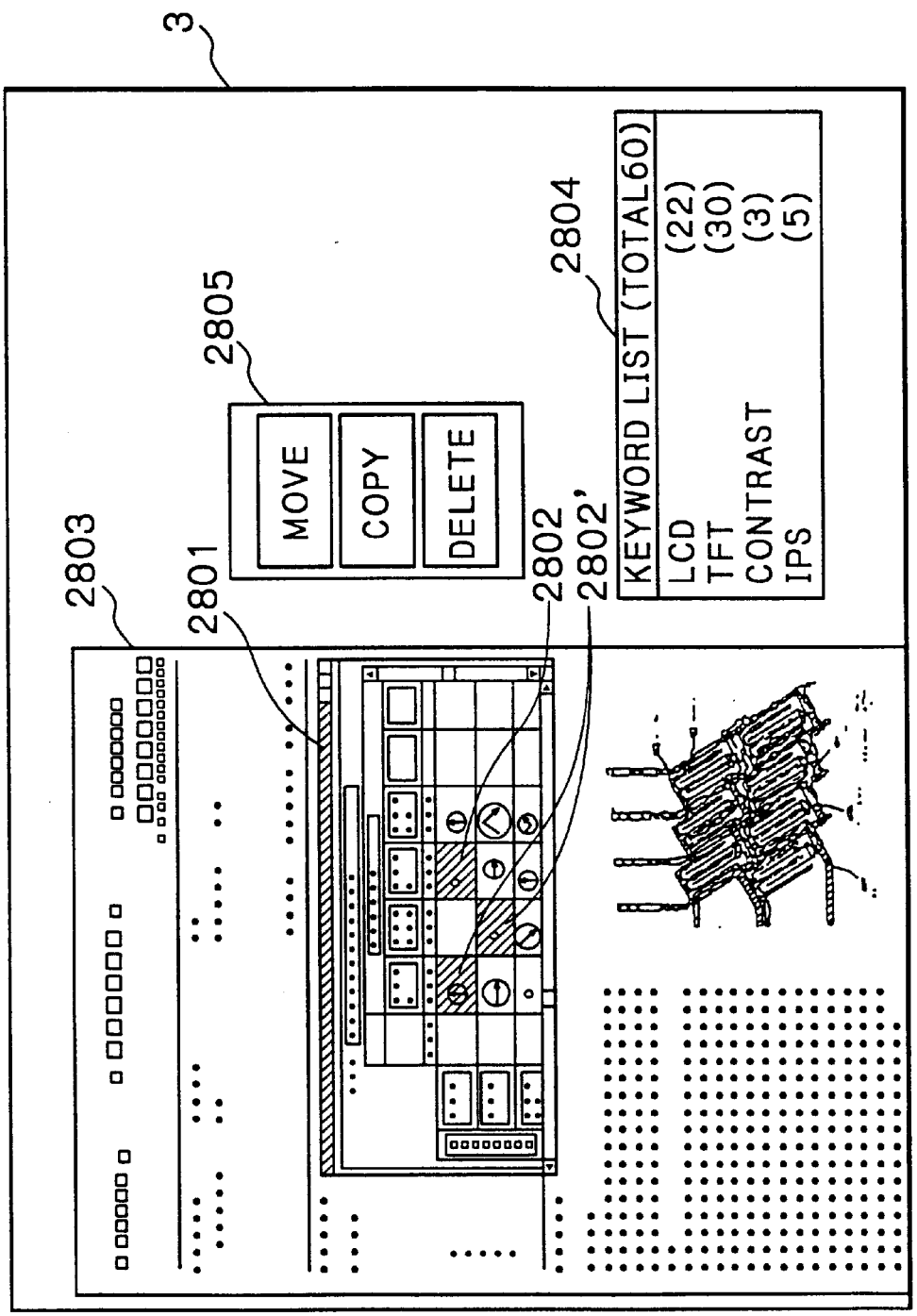
FIG. 28 is an example of an image displayed on the display unit of FIG. 5.

As illustrated in FIG. 28, when a patent map 2801 is being displayed on the display unit 3, a cell 2802 can be selected. Then, when the list display button 3231 of FIG. 5 is turned ON, patent publication numbers belonging to the selected cell are displayed on the display unit 3. Also, when the specification display button 3233 of FIG. 5 is turned ON, a patent publication 2803 is displayed on the display unit 3.

Further, cells 2802' to which the patent publication 2803 belongs can be highlighted or marked by color along with the cell 2802. This operation is carried out by the automatic document extracting unit 211 using the publication number storing unit 205 and the simultaneous cell storing unit 208 by the flowchart of FIG. 29.

First, at step 2901, one cell is selected from the publication number storing unit 205. Note that the publication number storing unit 205 stores patent publication numbers for each cell.

Next, at step 2902, a retrieval of a patent publication number, by the automatic document extracting unit 210, is performed upon the publication number storing unit 205. As a result, if the patent publication number is hit, the control proceeds to step 2903 which outputs cell information to the simultaneous cell storing unit 208. Otherwise, the control proceeds directly to step 2904.

Step 2904 repeats the control at steps 2901 through 2903 for all the cells in the publication number storing unit 205.

Figure 29:
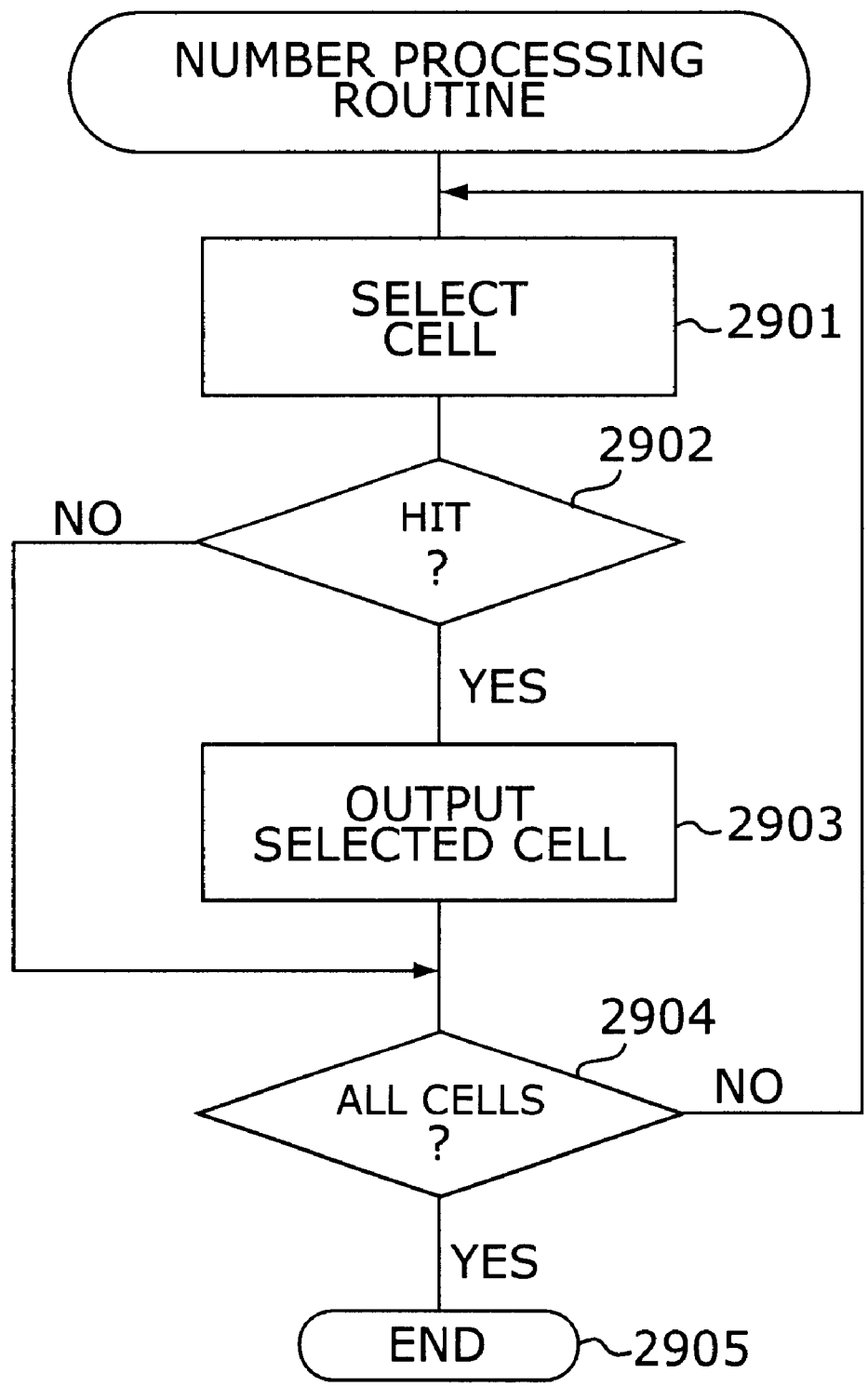
FIG. 29 is a flowchart showing the operation of the automatic document extracting unit of FIG. 11.

The flowchart of FIG. 29 is completed at step 2905.

When the simultaneous cell storing unit 208 receives hit cells from the publication number storing unit 205, the hit cells can be highlighted or displayed in a special color, thus visually indicating the cells to which the patent publication designated by the automatic document extracting unit 210 belongs.

Also, when the list display button 3231 is turned ON, a keyword list 2804 as illustrated in FIG. 28 is displayed on the display unit 3. The keyword list 2804 includes keywords along with the number of appearances used in the patent publication 2803, thus indicating the technical field of the patent publication 2803.

Also, in FIG. 11, the publication selecting unit 211 operated by the publication display button 3233 is used to maintain the currently-displayed patent publication in the cell of the publication number storing unit 205 or to remove it from the cell of the publication number storing unit 205, if necessary.

Further, in FIG. 11, a cell moving unit 219 operated by a cell moving button 2805 in FIG. 28 is connected to the publication number storing unit 205. As a result, the currently-displayed patent publication can be moved or copied to another cell, or removed from the current cell.

Additionally, in FIG. 11, the between-cell calculating unit 209 operated by the between-cell calculate button 3225 is connected to the publication number storing unit 205. For example, an OR logic, an AND logic and a NOT logic for retrieval conditions is performed upon one or more of the cells in the publication number storing unit 209, to generate a new cell. For example, an upper cell as a combination of two or more cells is generated by an AND logic, and a low cell formed of common patent publications in two or more cells is generated by an OR logic. Also, a cell formed by patent publications excluding a specific technology is generated by a NOT logic.

Figure 30:
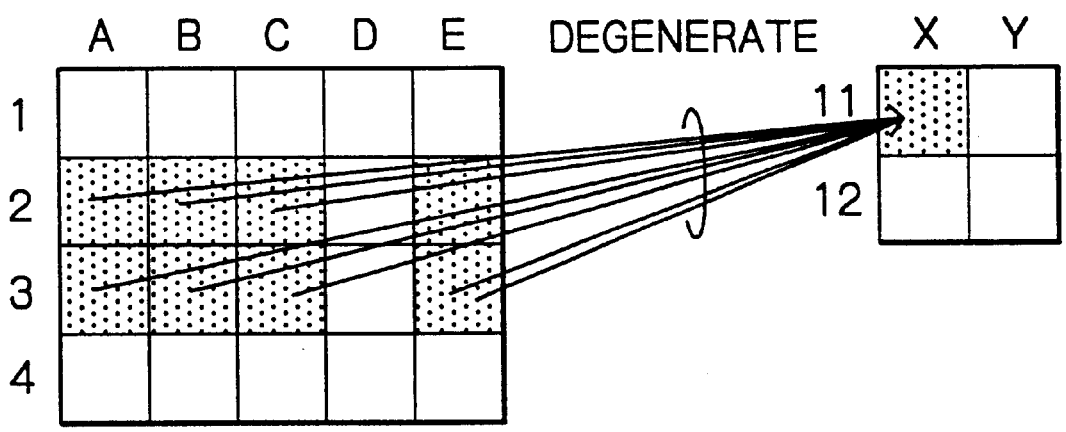
FIG. 30 is a diagram for explaining the degenerating operation of the automatic upper layer cell generating unit of FIG. 11.

Furthermore, in FIG. 11, the automatic upper layer cell generating unit 217 operated by the automatic upper layer cell generate button 3224 is connected to the cell output information generating unit 212. That is, as illustrated in FIG. 30, a degenerating operation is carried out, so that a plurality of cells having row items "2" and "3" and column items "A", "B", "C" and "E" are degenerated into one cell having row item "11" and column item "X". The operation of the automatic upper layer cell generating unit 217 is illustrated in FIG. 31.

First, at step 3101, an OR logic operation is performed upon patent publication umbers of selected cells, to store new patent publication numbers for a new cell.

Next, at step 3102, an OR logic operation is performed upon all the retrieval conditions of the selected cells, to store new retrieval conditions of the new cell.

Figure 31:
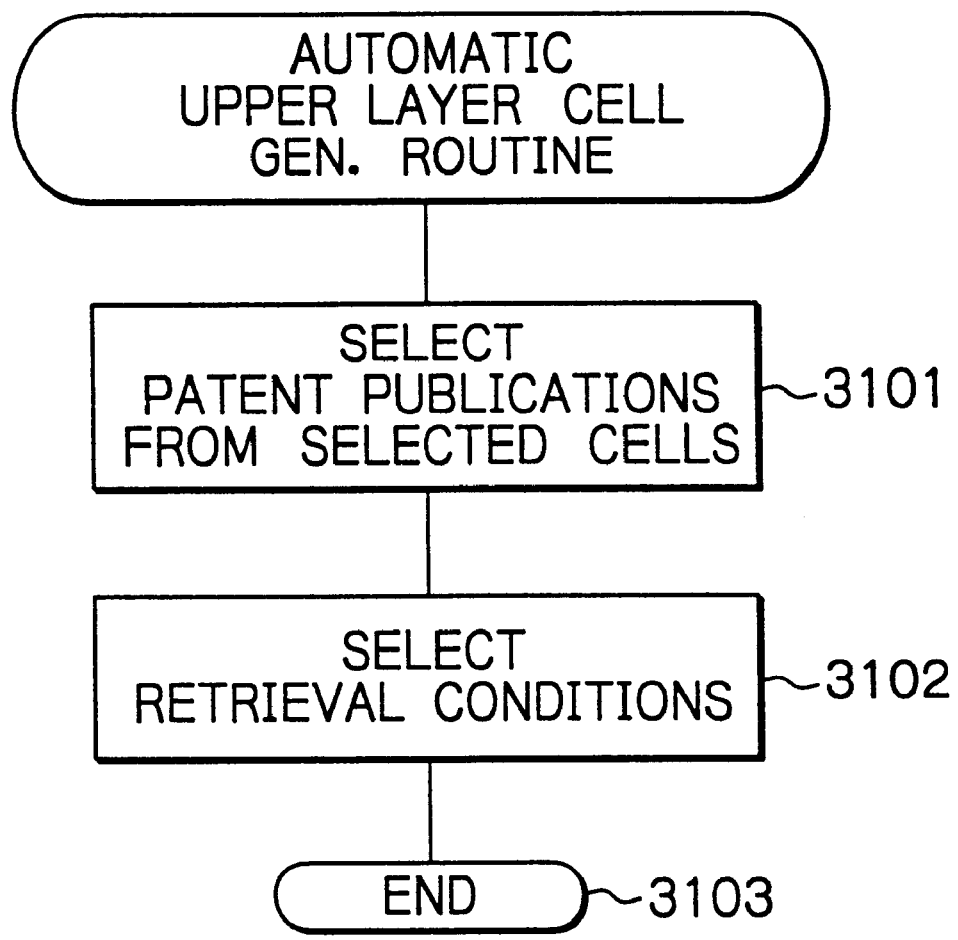
FIG. 31 is a flowchart showing the operation of the automatic upper layer cell generating unit of FIG. 11.

Thus, the flowchart of FIG. 31 is completed at step 3103.

Also, in FIG. 11, when a cell displayed on the display unit 3 is indicated by a mouse clock, a cell location unit 220 passes the location of the cell to the map item output unit 215, so that the items of the cell in the row direction and in the column direction are highlighted or indicated by a special color, thus indicating the technical field of the cell.

In the above-described embodiment, although a patent map is two-dimensional, the present invention can be applied to a three-dimensional or multi-dimensional patent map.

Also, the present invention can be applied to fields other than the patent field. For example, the present invention can be applied to financial affairs including sales and profits.

As explained hereinabove, according to the present invention, the tendency of information to increase or decrease can be easily indicated.

What is claimed is:

1. An information processing system comprising:

an information storing unit for storing a plurality of main information sets along with time information sets;

a retrieval condition input unit for inputting retrieval conditions for said main information sets;

a retrieval execution unit for performing a retrieval upon said main information sets along with said time information sets by using said retrieval conditions;

a cell output information generating unit for receiving retrieved main information sets along with said time information sets and generating a number of said main information sets and a tendency of the number of said main information sets to change with respect to time for each of cells defined by said retrieval conditions; and a cell output unit for outputting each of said cells and displaying each of said cells at a location on a matrix designated by said retrieval conditions.

2. The system as set forth in claim 1, wherein said cell output information generating unit comprises:
- a first counter for counting the number of said main information sets for each of said cells;
- a numeral-to-diagram conversion unit for converting the counted number of said main information sets into a first diagram; and
- a first diagram output unit for outputting said first diagram.

3. The system as set forth in claim 2, wherein said first diagram is a circle having a diameter corresponding to the counted number of said main information sets.

4. The system as set forth in claim 2, wherein said cell output information generating unit further comprises a first numeral output unit for outputting the counted number of said main information sets, so that the counted number of said main information sets is displayed adjacent to said diagram within each of said cells.

5. The system as set forth in claim 1, wherein said cell output information generating unit comprises:
- a second counter for counting the number of said main information sets for each of said cells for predetermined time periods;
- a first tendency determining unit for determining a tendency of said main information sets to change and generating a second diagram showing the tendency of said main information sets to change; and
- a second diagram output unit for outputting said second diagram.

6. The system as set forth in claim 5, wherein said second diagram is an arrow.

7. The system as set forth in claim 5, wherein said second diagram is a line diagram.

8. The system as set forth in claim 1, wherein said cell output information generating unit generates cells which include rows and columns, further comprising an item output information generating unit for receiving retrieved main information sets along with said time information sets and generating a number of said main information sets.

9. The system as set forth in claim 8, wherein said item output information generating unit comprises:
- a third counter for counting the number of said main information sets for each of said rows and columns of said cells;
- a numeral-to-diagram conversion unit for converting the counted number of said main information sets into a third diagram; and
- a third diagram output unit for outputting said third diagram.

10. The system as set forth in claim 9, wherein said third diagram is a circle having a diameter corresponding to the counted number of said main information sets.

11. The system as set forth in claim 8, wherein said item output information generating unit further comprises a second numeral output unit for outputting the counted number of said main information sets, so that the counted number of said main information sets is displayed adjacent to a diagram within each of said rows and columns of said cells.

12. The system as set forth in claim 8, wherein said item output information generating unit comprises:
- a fourth counter for counting the number of said main information sets for each of said rows and columns of said cells for predetermined time periods;
- a second tendency determining unit for determining a tendency of said main information sets to change and generating a fourth diagram showing the tendency of said main information sets to change; and
- a fourth diagram output unit for outputting said fourth diagram.

13. The system as set forth in claim 12, wherein said second diagram is an arrow.

14. The system as set forth in claim 12, wherein said second diagram is a line diagram.

15. The system as set forth in claim 8, further comprising:
- a map information storing unit for storing row and column information of said cells; and
- a map item information output unit for outputting the row and column information of said cells, the number of said main information sets and the tendency of the number of main information sets to change with respect to time for each of said rows and columns of said cells.

16. The system as set forth in claim 1, wherein said retrieval conditions are formed by attributes of said main information sets.

17. The system as set forth in claim 1, wherein said retrieval conditions are formed by keywords of said main information sets.

18. The system as set forth in claim 2, wherein said retrieval condition input unit receives an additional retrieval condition,
   said retrieval execution unit performing said retrieval in accordance with said additional retrievals condition,
   said cell output information generating unit generating the number of said main information sets and the tendency of the number of said main information sets to change with respect to time in accordance with said additional retrieval condition,
   said cell output unit outputting said cells each having a plurality of numbers of said main information sets and a plurality of tendencies of the numbers of said main information sets to change with respect to time in accordance with said additional retrieval condition.

19. The system as set forth in claim 8, wherein said item output information generating unit generates the number of said main information sets and the tendency of the number of said main information sets to change with respect to time in accordance with an additional retrieval condition, so that each of said rows and columns of said cells each has a plurality of numbers of said main information sets and a plurality of tendencies of the numbers of said main information sets to change with respect to time in accordance with said additional retrieval condition.

20. The system as set forth in claim 1, wherein said cell output unit comprises:
- a sound conversion unit for converting the tendency of the number of said main information sets to change with respect to time into a sound; and
- a sound output unit for receiving said sound signal to generate a sound.

21. The system as set forth in claim 1, wherein said cell output unit comprises:
- a portrait conversion unit for converting the tendency of the number of said main information sets to change with respect to time into a portrait signal; and
- a portrait output unit for receiving said portrait signal to generate a portrait.

22. The system as set forth in claim 1, wherein said cell output unit comprises:
- a game image conversion unit for converting the tendency of the number of said main information sets to change with respect to time into a game image signal; and a game image output unit for receiving said game image signal to generate a game image.

23. The system as set forth in claim 1, wherein said cell output unit comprises:
a character image conversion unit for converting the tendency of the number of said main information sets to change with respect to time into a character image signal; and
a character image output unit for receiving said character image signal to generate a character image.

24. The system as set forth in claim 1, wherein said cell output unit comprises:
a motion picture conversion unit for converting the tendency of the number of said main information sets to change with respect to time into a motion picture signal; and
a motion picture output unit for receiving said motion picture signal to generate a motion picture.

25. The system as set forth in claim 1, wherein said cell output unit comprises:
a stationary picture conversion unit for converting the tendency of the number of said main information sets to change with respect to time into a stationary picture signal; and
a stationary picture output unit for receiving said stationary picture signal to generate a stationary picture.

26. The system as set forth in claim 1, further comprising a map information preserving unit for storing said retrieved main information sets along with said time information sets.

27. The system as set forth in claim 18, further comprising a map merging unit for merging a first matrix of said cells in accordance with a first value of said additional retrieval condition with a second matrix of said cells in accordance with a second value of said additional retrieval condition to generate a third matrix of cells.

28. The system as set forth in claim 1, further comprising a between-cell calculating unit for performing a logic operation using said retrieval conditions upon said main information sets of a plurality of cells to generate a cell.

29. The system as set forth in claim 1, further comprising an upper layer cell generating unit for performing a degeneration operation upon a plurality of said cells by using a plurality of said retrieval conditions to generate one cell.

30. The system as set forth in claim 1, further comprising a display unit for displaying said cells.

31. The system as set forth in claim 1, further comprising a map item output unit for outputting items of rows and columns of said cells and displaying said items in rows and columns of said matrix.

32. The system as set forth in claim 1, further comprising:
a display unit for displaying said cells and one of said main information sets of one of said cells; and
a cell moving unit for moving the one of said main information sets from the one of said cells to another of said cells.

33. The system as set forth in claim 1, further comprising:
a display unit for displaying said cells and one of said main information sets of one of said cells; and
a cell moving unit for copying the one of said main information sets to another of said cells.

34. The system as set forth in claim 1, further comprising:
a display unit for displaying said cells and one of said main information sets of one of said cells;
a cell moving unit for removing the one of said main information sets to another of said cells.

35. The system as set forth in claim 1, further comprising:
an information storing unit for storing said retrieved main information sets along with said time information sets;
a display unit for displaying said cells and one of said main information sets of one of said cells;
an information selecting unit for removing the one of said main information sets from said information storing unit.

36. The system as set forth in claim 1, wherein said retrieval conditions include applicant information.

37. The system as set forth in claim 1, wherein said retrieval conditions include technical rank information.

38. The system of claim 1, wherein the tendency is shown as an arrow having affixed a ratio of increased or decreased patent publications.

39. An information processing system comprising:
an information storing unit for storing a plurality of main information sets along with time information sets; wherein each of said main information sets includes a patent publication and attributes, and each of said time information sets includes a filing date, a publication date and a registered date;
a retrieval condition input unit for inputting retrieval conditions for said main information sets;
a retrieval execution unit for performing a retrieval upon said main information sets along with said time information sets by using said retrieval conditions;
a cell output information generating unit for receiving retrieved main information sets along with said time information sets and generating a number of said main information sets and a tendency of the number of said main information sets to change with respect to time for each of cells defined by said retrieval conditions; and
a cell output unit for outputting each of said cells and displaying each of said cells at a location on a matrix designated by said retrieval conditions.

40. The system as set forth in claim 39, wherein said attributes are an International Patent Class, applicants and inventors.

41. The system as set forth in claim 39, wherein said retrieval execution unit performs said retrieval upon said main information along with said time information sets for each of applicants, and
said cell output information generating unit generates numbers of said main information sets and tendencies of the numbers of said main information sets to change with respect to time for said applicants for each of said cells.

42. The system as set forth in claim 40, wherein said cell output unit displays pi-chart-type diagram where a ratio of the numbers of said main information sets by said applicants is shown.

43. The system as set forth in claim 42, further comprising a cell location unit, so that, when a cell is indicated, one item of said rows and one items of said columns to which said indicated cell belongs is highlighted.

44. The system as set forth in claim 42, further comprising a cell location unit, so that, when a cell is indicated, one item of said rows and one item of said columns to which said indicated cell belongs is indicated by a special color.

45. An information processing system comprising:
an information storing unit for storing patent publications;
a retrieval condition input unit for inputting patent applicant information as a retrieval condition;
a retrieval execution unit for performing a retrieval upon said patent publications by using said patent applicant information;

a cell output information generating unit for receiving retrieved patent publications and generating a number of said patent publications per said patent applicant information and a tendency of the number of said patent publications per said patent applicant information to change with respect to time for each of cells defined by retrieval conditions than said patent applicant information; and a cell output unit for outputting each of said cells and displaying each of said cells at a location on a matrix designated by said other retrieval conditions.

46. An information processing system comprising:

an information storing unit for storing patent publications;

a retrieval condition input unit for inputting a plurality of pieces of patent applicant information as retrieval conditions;

a retrieval execution unit for performing retrievals upon said patent publications by using said plurality of pieces of patent applicant information;

a cell output information generating unit for receiving retrieved patent publications and generating a number of said patent publications per each of said plurality of pieces of patent applicant information and a tendency of the number of said patent publications per each of said plurality of pieces of patent applicant information to change with respect to time for each of cells defined by retrieval conditions than said patent applicant information; and a cell output unit for outputting each of said cells and displaying each of said cells at a location on a matrix designated by said other retrieval conditions, so that the numbers of said patent publications and the tendency of the numbers of said patent publications to change with respect to time of said plurality of pieces of patent applicant information are displayed in each of said cells.

47. The system as set forth in claim 46, wherein said cell output unit displays a graph showing ratios of the numbers of said patent publications of specified pieces of said patent applicant information to the number of said patent publications of all the pieces of said patent applicant information in each of said cells.

48. The system as set forth in claim 46, wherein said cell output unit displays a graph showing ratios of the numbers of said patent publications of specified pieces of said patent applicant information in each of said cells.

49. An information processing system comprising:

an information storing unit for storing at least claims and abstracts of patent publications;

a retrieval condition input unit for inputting a retrieval condition;

a retrieval execution unit for performing a retrieval upon said patent publications by using said retrieval condition;

a cell output information generating unit for receiving retrieved patent publications and generating a number of patent publications and a tendency of the number of said patent publications to change with respect to time for each of cells defined by other retrieval conditions; and a cell output unit for outputting each of said cells and displaying each of said cells at a location on a designated matrix, said retrieval execution unit extracting said patent publications using one or more keywords and allocating said patent publications to said cells in accordance with said keywords.

50. The system as set forth in claim 49, wherein said retrieval execution unit allocating said patent publications in accordance with the numbers of appearances of said keywords.

51. An information processing apparatus comprising:

an information storing unit for storing a plurality of documents along with time information;

a retrieval condition input unit for inputting a retrieval condition for said documents;

a retrieval execution unit for performing upon said documents by using said retrieval condition;

a cell output information generating unit for receiving retrieved documents and generating a number of said documents and a tendency of the number of said documents to change with respect to time for each of cells defined by other retrieval conditions;

a cell output unit for outputting each of said cells and displaying each of said cells at a location on a matrix designated by said other retrieval conditions; and a document designating unit for designating a specified document, so that said cell output unit highlights or indicates by a special color at least one of said cells to which said specified document, belongs.

52. An information processing apparatus comprising:

an information storing unit for storing a plurality of documents along with time information;

a retrieval condition input unit for inputting a retrieval condition for said documents;

a retrieval execution unit for performing upon said documents by using said retrieval condition;

a cell output information generating unit for receiving retrieved documents and generating a number of said documents and a tendency of the number of said documents to change with respect to time for each of cells defined by other retrieval conditions;

a cell output unit for outputting each of said cells and displaying each of said cells at a location on a matrix designated by said other retrieval conditions; and a document designating unit for displaying said specified document, so that said cell output unit highlights or indicates by a special color at least one of said cells to which said specified document belong.

53. The system as set forth in claim 52, further comprising a keyword list displaying unit for displaying a list of keywords of said retrieved document.

54. The system as set forth in claim 52, further comprising a document selecting unit for maintaining said retrieved document in the displayed one of said cells and removing said retrieved document from the displayed one of said cells.

55. The system as set forth in claim 52, further comprising a cell moving unit for copying the retrieved document from the displayed one of said cells to another one of said cells or removing the retrieved document from the displayed one of said cells.

* * * * *